United States Patent [19]
Suarez et al.

[11] Patent Number: 5,835,657
[45] Date of Patent: Nov. 10, 1998

[54] FIBER OPTIC SPLICE TRAY

[75] Inventors: Wilson E. Suarez; Colin M. Smith, both of Burbank, Calif.

[73] Assignee: PSI Telecommunications, Inc., Burbank, Calif.

[21] Appl. No.: 759,575

[22] Filed: Dec. 5, 1996

Related U.S. Application Data

[60] Provisional application No. 60/008,407, Dec. 8, 1995.

[51] Int. Cl.$^6$ .................................................. G02B 6/36
[52] U.S. Cl. ............................................................ 385/135
[58] Field of Search ............................. 385/53, 134, 135, 385/136, 137, 147

[56] References Cited

U.S. PATENT DOCUMENTS

| | | |
|---|---|---|
| 3,757,031 | 9/1973 | Izraeli . |
| 3,760,811 | 9/1973 | Andrew . |
| 3,856,246 | 12/1974 | Sinko . |
| 3,924,055 | 12/1975 | Moore et al. . |
| 4,108,534 | 8/1978 | Le Noane et al. . |
| 4,118,838 | 10/1978 | Schiefer et al. . |
| 4,239,335 | 12/1980 | Stiles . |
| 4,266,853 | 5/1981 | Hutchins et al. . |
| 4,359,262 | 11/1982 | Dolan . |
| 4,373,776 | 2/1983 | Purdy . |
| 4,395,089 | 7/1983 | McKee . |
| 4,445,750 | 5/1984 | Grois et al. . |
| 4,447,120 | 5/1984 | Borsuk . |
| 4,538,021 | 8/1985 | Williamson, Jr. . |
| 4,548,465 | 10/1985 | White . |
| 4,558,174 | 12/1985 | Massey . |
| 4,612,680 | 9/1986 | Daiguji . |
| 4,627,686 | 12/1986 | Szentesi . |
| 4,679,896 | 7/1987 | Krafcik et al. . |
| 4,684,196 | 8/1987 | Smith et al. . |
| 4,687,289 | 8/1987 | DeSanti . |
| 4,702,551 | 10/1987 | Coulombe ........................... 385/135 X |
| 4,744,627 | 5/1988 | Chande et al. . |
| 4,754,876 | 7/1988 | Noon et al. . |
| 4,761,052 | 8/1988 | Buekers et al. . |
| 4,799,757 | 1/1989 | Goetter . |
| 4,805,979 | 2/1989 | Bossard et al. . |
| 4,902,855 | 2/1990 | Smith . |
| 4,911,521 | 3/1990 | Ryuto et al. ............................. 385/135 |
| 4,913,522 | 4/1990 | Nolf et al. . |
| 4,927,227 | 5/1990 | Bensel, III et al. . |
| 4,932,744 | 6/1990 | Messelhi ................................. 385/135 |
| 4,963,700 | 10/1990 | Olsen et al. . |

(List continued on next page.)

FOREIGN PATENT DOCUMENTS

| | | |
|---|---|---|
| 0 077 115 | 4/1983 | European Pat. Off. . |
| 0 043 570 | 4/1984 | European Pat. Off. . |
| 0 159 857 | 10/1985 | European Pat. Off. . |
| 0 213 365 | 3/1987 | European Pat. Off. . |
| 30 06 131 | 9/1981 | Germany . |
| 37 06 518 | 9/1988 | Germany . |
| 52-13346 | 2/1977 | Japan . |
| 55-100504 | 7/1980 | Japan . |
| 55-127507 | 10/1980 | Japan . |
| 55-127508 | 10/1980 | Japan . |
| 2 124 439 | 2/1984 | United Kingdom . |
| 2 176 024 | 12/1986 | United Kingdom . |
| 2 254 163 | 4/1994 | United Kingdom . |

*Primary Examiner*—Phan T. H. Palmer
*Attorney, Agent, or Firm*—Graham & James LLP

[57] ABSTRACT

A fiber optic splice closure assembly has a generally elongate casing having two generally parallel side walls, first and second end walls and a generally planar base, the side walls and end walls extending substantially perpendicular to the base. The optical fiber splice tray may include a combination of one or more: lateral pivot assemblies; longitudinal hinge assemblies; alignment bosses; buffer tube receiving channels having a buffer tube retainer; insert retention socket and insert; splice block; tier bracket hinge assembly and interlocking assembly to assist in aligning and securing a plurality of such splice trays together and to secure buffer tubes within the splice tray and assist in optical fiber dressing within the splice tray.

28 Claims, 14 Drawing Sheets

U.S. PATENT DOCUMENTS

| | | | |
|---|---|---|---|
| 4,988,834 | 1/1991 | Birch . | |
| 4,991,928 | 2/1991 | Zimmer . | |
| 5,007,701 | 4/1991 | Roberts . | |
| 5,042,901 | 8/1991 | Merriken et al. | 385/135 |
| 5,059,748 | 10/1991 | Allen et al. | 174/87 |
| 5,074,635 | 12/1991 | Justice et al. | 385/95 |
| 5,097,529 | 3/1992 | Cobb et al. | 385/135 |
| 5,133,039 | 7/1992 | Dixit | 385/135 |
| 5,136,121 | 8/1992 | Kluska et al. | 174/93 |
| 5,151,964 | 9/1992 | Carpenter et al. | 385/98 |
| 5,155,303 | 10/1992 | Bensel, III et al. | 174/93 |
| 5,155,781 | 10/1992 | Doss et al. | 385/71 |
| 5,155,787 | 10/1992 | Carpenter et al. | 385/98 |
| 5,155,794 | 10/1992 | Nolf et al. | 385/135 |
| 5,189,725 | 2/1993 | Bensel, III et al. | 385/135 |
| 5,199,099 | 3/1993 | Dalgoutte | 385/135 |
| 5,206,927 | 4/1993 | Finzel et al. | 385/135 |
| 5,222,183 | 6/1993 | Daems et al. | 385/135 |
| 5,224,199 | 6/1993 | Cortijo | 385/135 |
| 5,237,635 | 8/1993 | Lai | 385/101 |
| 5,245,151 | 9/1993 | Chamberlain et al. | 219/10.57 |
| 5,249,253 | 9/1993 | Franckx et al. | 385/135 |
| 5,255,337 | 10/1993 | Theys et al. | 385/135 |
| 5,258,578 | 11/1993 | Smith et al. | 174/93 |
| 5,278,933 | 1/1994 | Hunsinger et al. | 385/135 |
| 5,288,946 | 2/1994 | Jackson et al. | 174/74 |
| 5,308,923 | 5/1994 | Puigcerver et al. | 174/87 |
| 5,309,538 | 5/1994 | Larson | 385/98 |
| 5,323,478 | 6/1994 | Milanowski et al. | 385/135 |
| 5,323,480 | 6/1994 | Mullaney et al. . | |
| 5,353,366 | 10/1994 | Bossard | 385/134 |
| 5,375,185 | 12/1994 | Hermsen et al. | 385/135 |
| 5,420,957 | 5/1995 | Burek et al. | 385/135 |
| 5,446,823 | 8/1995 | Bingham et al. | 385/135 |
| 5,479,553 | 12/1995 | Daems et al. | 385/135 |
| 5,491,766 | 2/1996 | Huynh et al. | 385/100 |
| 5,495,549 | 2/1996 | Schneider et al. | 385/135 |
| 5,509,099 | 4/1996 | Hermsen et al. | 385/134 |
| 5,553,186 | 9/1996 | Allen | 385/135 |
| 5,631,993 | 5/1997 | Cloud et al. | 385/135 |
| 5,633,973 | 5/1997 | Vincent et al. | 385/135 |

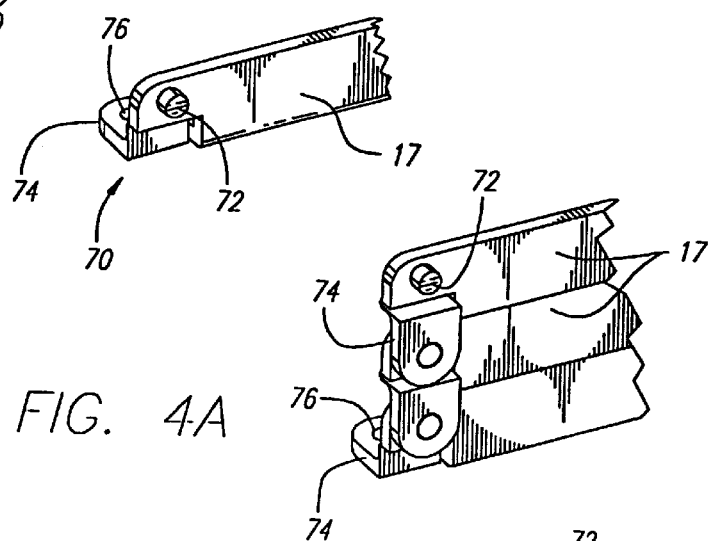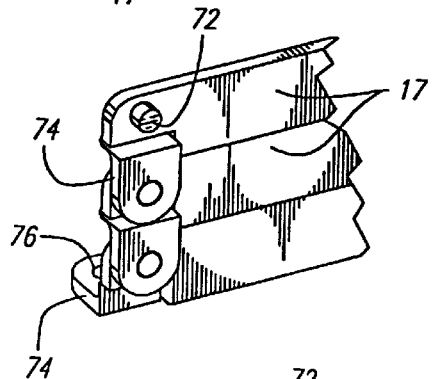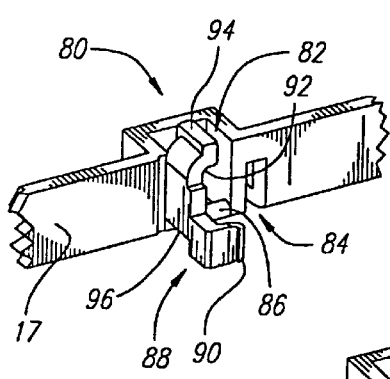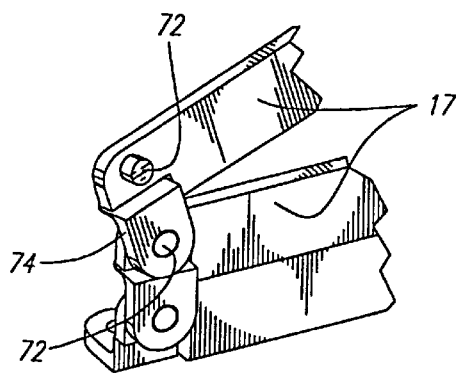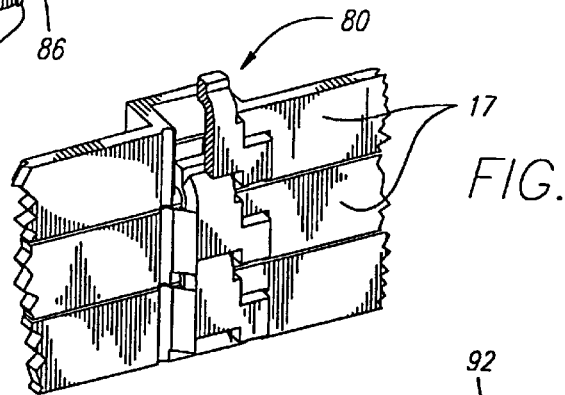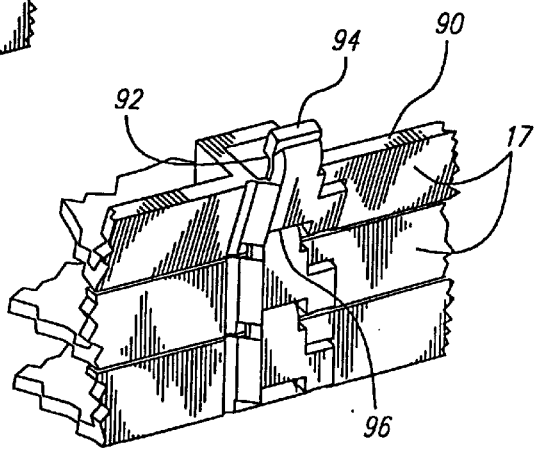

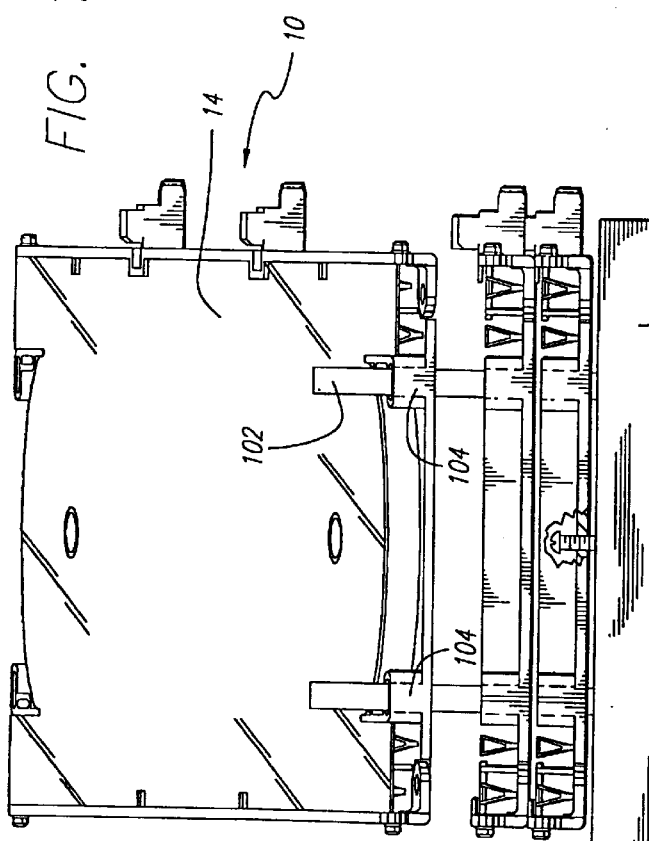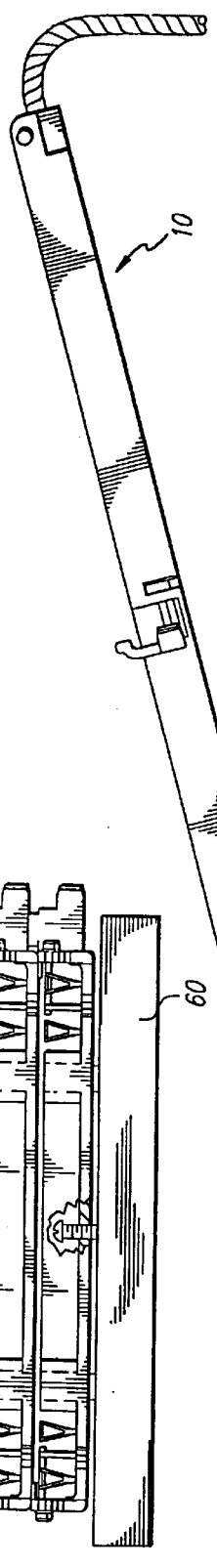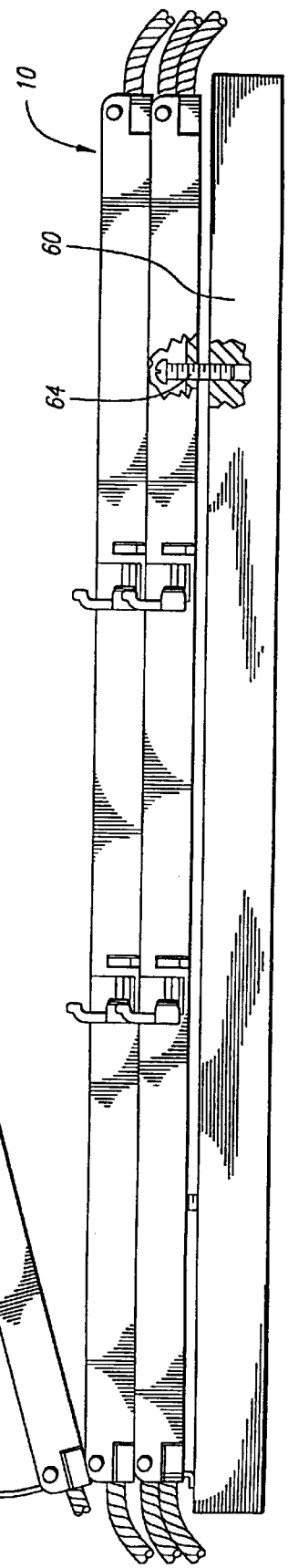

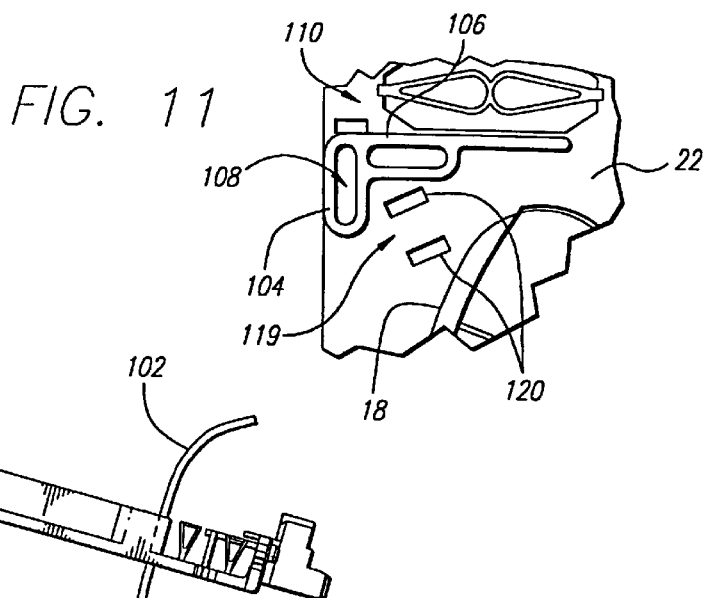
FIG. 11
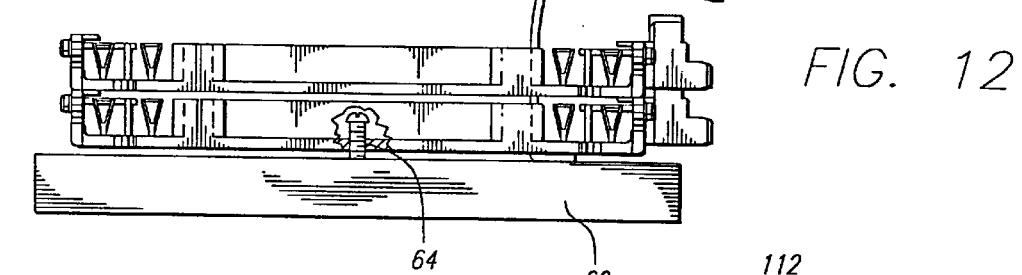
FIG. 12
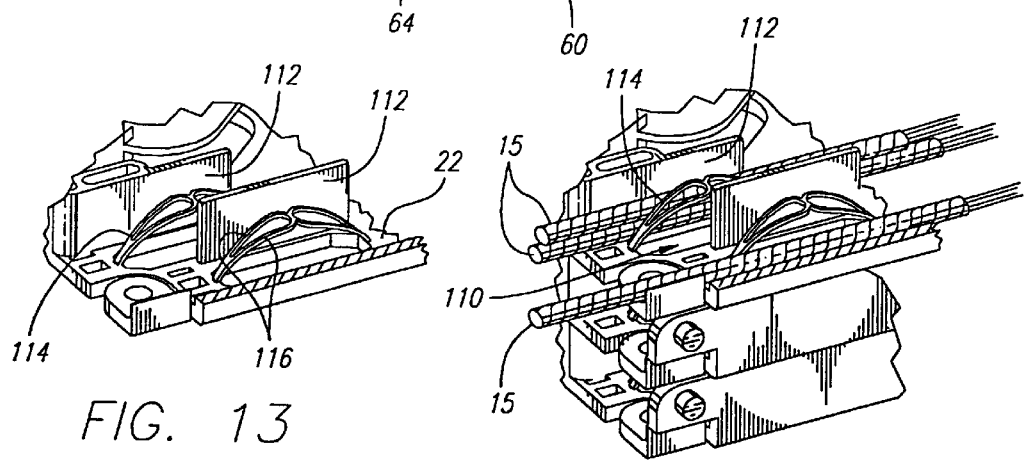
FIG. 13
FIG. 14
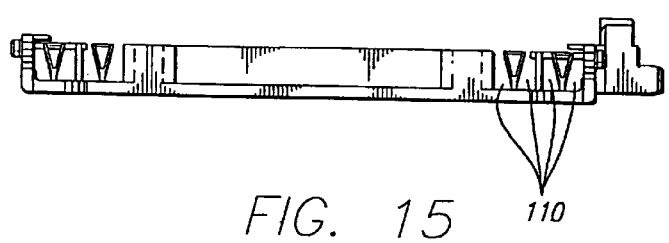
FIG. 15

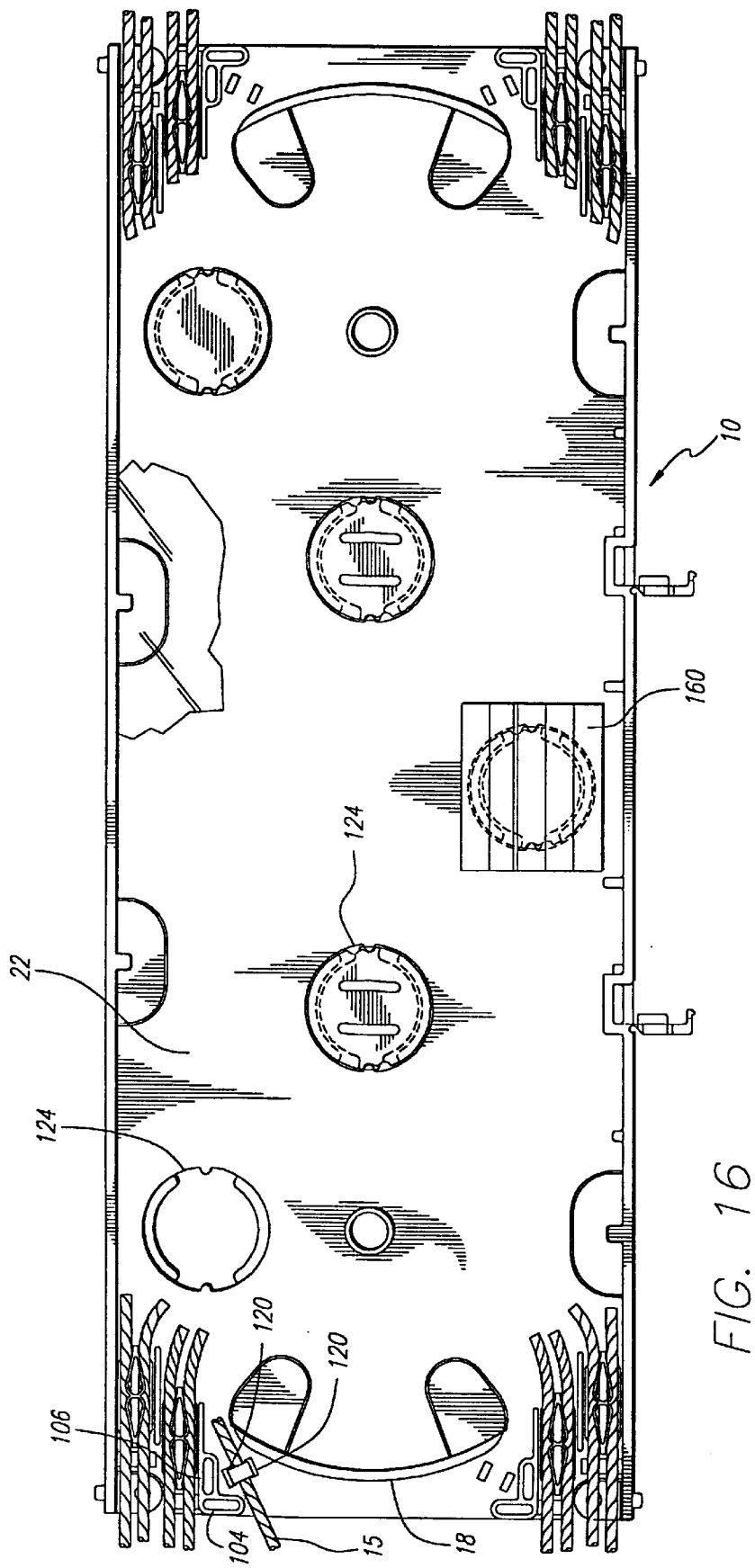

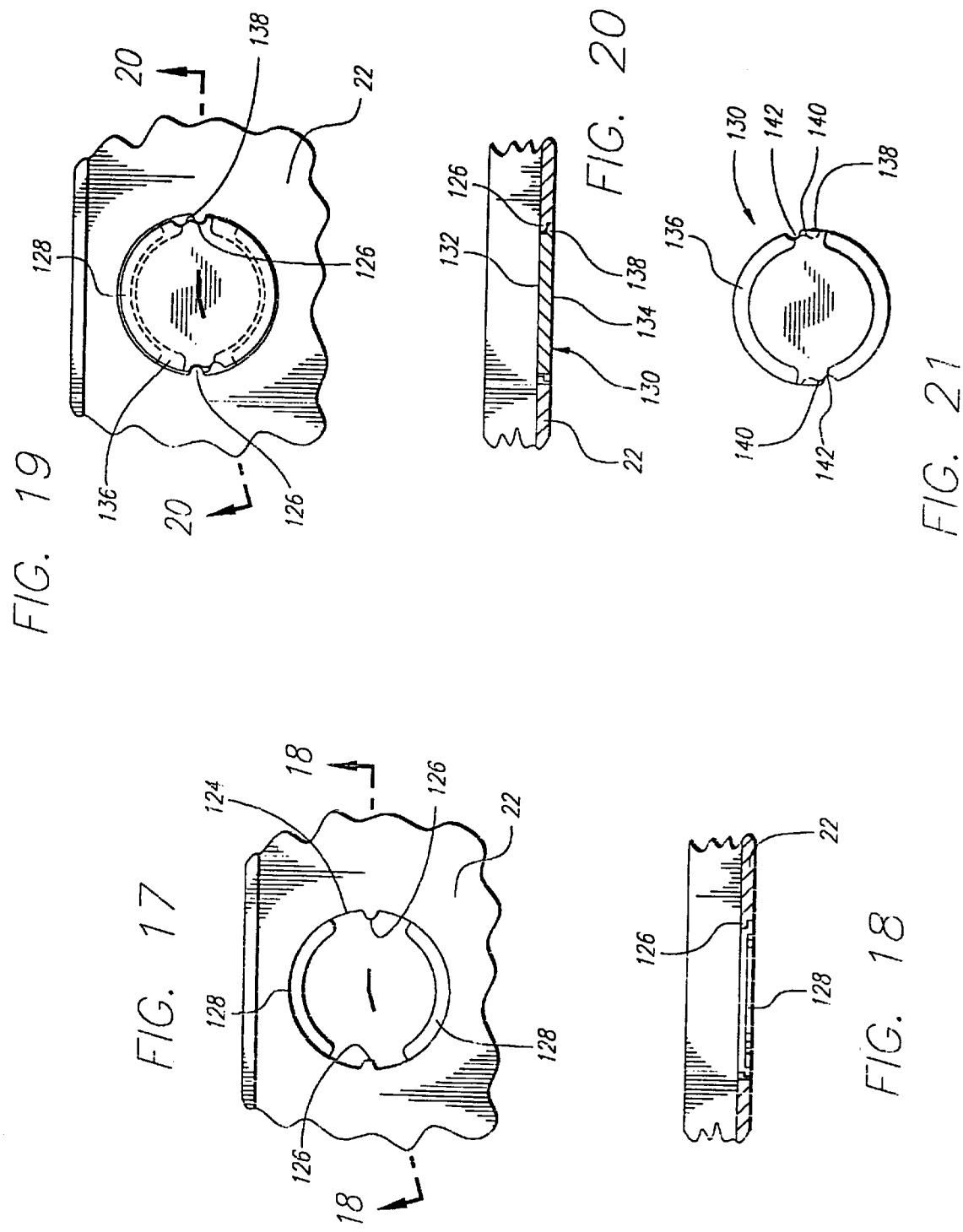

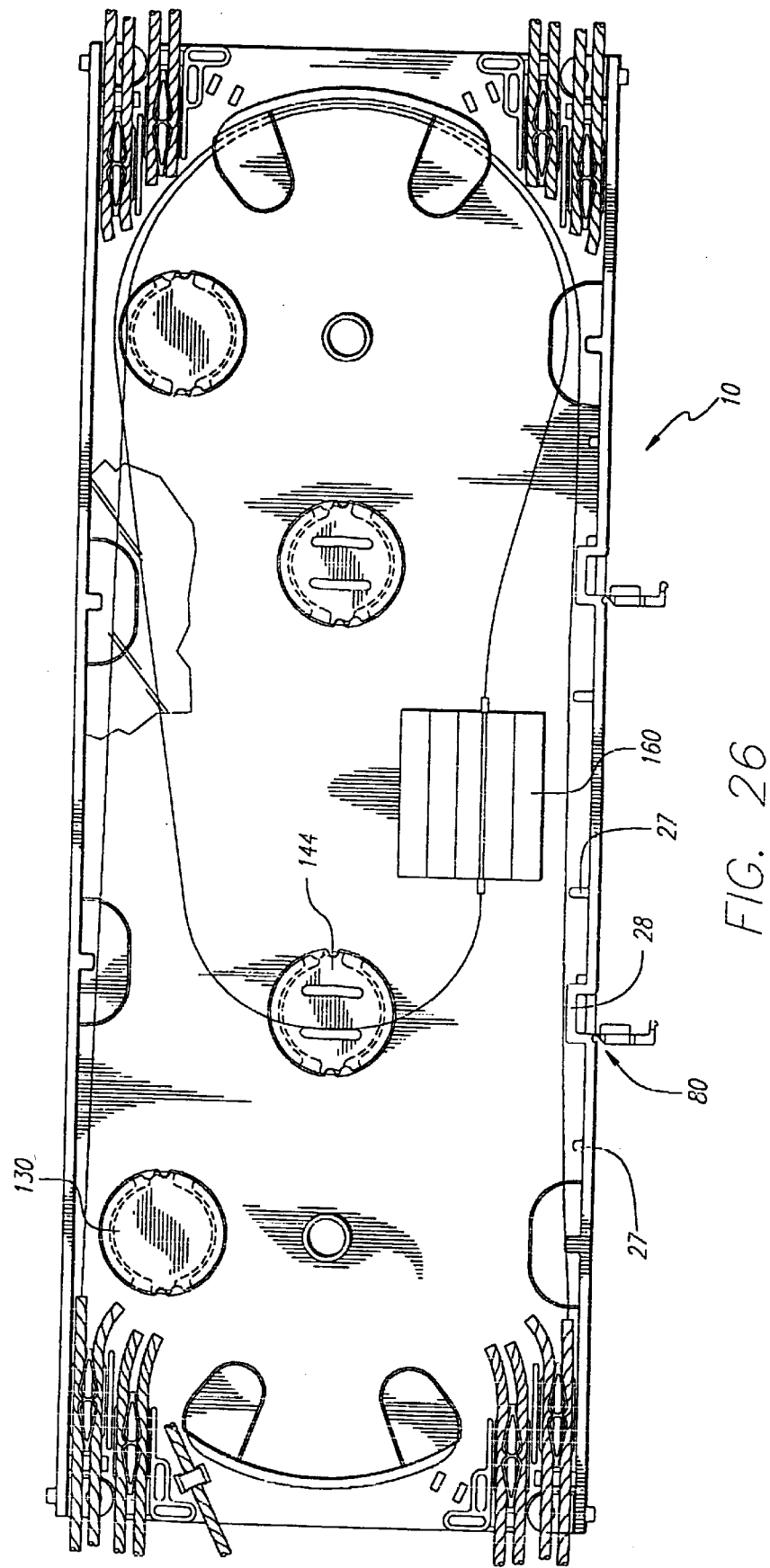

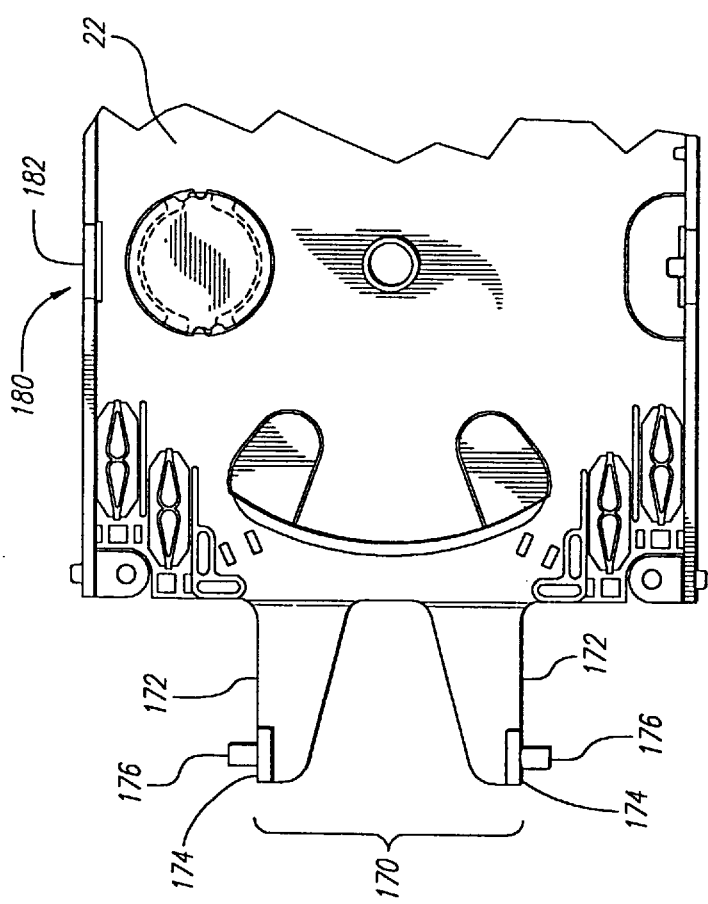
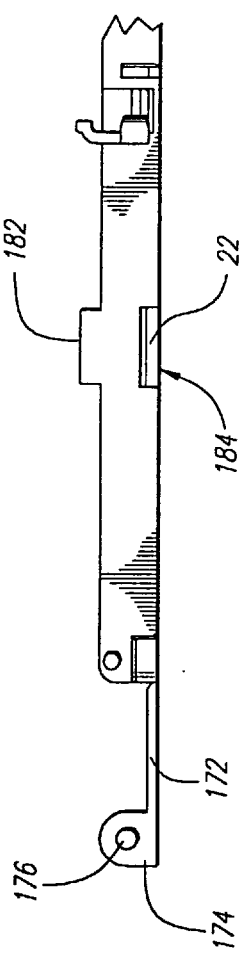

FIBER OPTIC SPLICE TRAY

REFERENCE TO RELATED PROVISIONAL APPLICATION

In accordance with 37 C.F.R. §1.78(a)(4), the present application claims the benefit of prior filed U.S. Provisional Application Serial No. 60/008,407, filed on Dec. 8, 1995. This application is incorporated herein by this reference.

BACKGROUND

1. Field of the Invention

The present invention is generally directed to the optical fiber art and, more particularly, to splice trays and other apparatus for organizing and storing optical fiber splices and/or surplus fiber.

2. Description of the Prior Art and Related Information

Due to the small size and relative fragility of optical fibers, they must be handled and stored with special care. The handling and storage problems are particularly acute in multi-fiber cables where individual fibers must be spliced to allow adding of branch lines or for repairs and adjustments to be made. In addition, fiber slack must normally be provided adjacent the splices and the need to store the slack further complicates the problems.

Optical fiber cables consist of a number of plastic buffer tubes which typically may be from five to ten in number. Each buffer tube contains a number of optical fibers, typically from one to twelve optical fibers. Optical fibers may also be provided in a larger, ribbon cable configuration in which fibers are provided in a flat ribbon within a buffer tube. The optical fibers themselves are covered with a protective plastic coating.

Prior to splicing one optical fiber to another, the plastic coating is first removed from the optical fiber to expose the glass. This may be done by immersing the fiber in a methylene chloride solution or by other conventional means. The exposed fibers are then trimmed with a suitable hand tool to ensure that the ends of the fibers have a clean sharp cut. The two fibers are placed in a fusion splicer and accurately aligned following which an electric arc is discharged at the ends of the fibers to melt the glass and fuse the two fibers together. Prior to the splicing operation a protective sleeve is slid over one of the fibers and shifted to a position out of the way of the splice region, and after the splice is made the protective sleeve is slid over the splice to protect the same.

Various arrangements have been provided for organizing the individual fibers after splicing. In general the individual fibers are organized by putting the splices into the protective sleeves, as discussed, and mounting the individual splices on a splice block in the splice tray which forms a permanent part of the splice tray. The splice tray and splice block keep the fibers from being tangled and the splice tray also holds the fibers in a manner to insure that the minimum bend radius of the glass fiber is not exceeded.

One splice tray may be provided to protect and retain each fiber splice from one pair of buffer tubes, depending on the capacity of the splice tray, when two cables, each containing one buffer tube are to be spliced together. The capacity of a splice tray can be limited by the number of buffer tubes it can capture and retain at the entrance of the splice tray. Prior art splice trays typically retain buffer tubes by directing each buffer tube into a channel at the entrance of the splice tray and securing the buffer tube to the splice tray by a friction fit between solid plastic or metal pins within the channel or, further, with a tie-wrap. This can put undue pressure on the optical fibers within the buffer tube.

The capacity of a splice tray may also limited by the maximum number of splices it can retain in the splice block provided within the splice tray. Prior art splice trays have proposed a molded-in-place splice block for holding as few as two or four splices, for example. Other prior art splice trays have proposed plastic splice blocks molded-in-place at various locations within the splice tray, consistent with the geometry of the optical fiber dressing within the splice tray. Providing a fixed splice block can limit the geometry of cable dressing or limit the capacity of a splice tray.

The capacity of a splice tray may also be limited by the availability of alternate optical fiber dressing, or routing, within the splice tray to insure excess lengths of optical fiber within the splice tray are not tangled or confused. Prior art splice trays have been proposed which provide generally arcuate end walls and one or more fixed islands within the splice tray to ensure the optical fiber is maintained at an appropriate bend radius within the splice tray. Providing a fixed geometry configuration within the splice tray may limit the available cable dressing configurations and inadvertently limit the number of splices a splice tray may carry.

The number of optical fibers and buffer tubes in each cable has been increasing as optical fiber technology stabilizes and becomes more desirable. As a result, it may be desirable to join two fiber optic cables each of which contain five to ten buffer tubes of six to twelve fibers. In order to meet the need to retain and protect an increasing number of splices, splice trays having a greater capacity are increasingly needed.

Further, in order to multiply the capacity of various splice trays, splice trays may be placed in a stacked relationship and bolted together to form a single unit. The stack of splice trays is secured in a protected receptacle, such as a closure. This stacked arrangement may provide adequate splice capacity for the hundreds of splices which may be required in a closure. At the same time, however, the manner of stacking severely limits access into an identified splice tray to effect repairs or adjustments on a defective splice. In order to repair a defective splice the closure is opened and the stack of splice trays is disassembled to gain access to the splice tray containing the splice to be repaired or rerouted. This process is made more difficult once the splice trays are disassembled because there may be no provision for retaining and organizing the remaining trays to provide the operator with a clear work area within the closure in order to effect repairs.

To help organize splice trays within a closure, a number of optical fiber splice closures have been proposed in the prior art with "built-in" splice tray organizers. These closures include substantial dedicated hardware to which may be secured customized optical fiber splice trays. The closures, hardware and splice trays are specialized and correspondingly, expensive.

Many different optical fiber splice trays have also been proposed in the prior art which are not specialized or dedicated to a specific closure. These prior art splice trays have suffered from a variety of defects and drawbacks making them complex and difficult to use. Typically, they have limited capacity because a limited number of buffer tube channels are provided, a limited number of splice locations are available in the splice block and a fixed geometry within the splice tray limits the fiber dressing options. In addition, prior splice trays have used a "snap-in" buffer tube channel configuration which have tended to place undue stress on the fibers within the buffer tubes resulting in fiber damage. Finally, these splice trays typically provide no provision for providing access to a selected optical fiber splice within a selected splice tray of a stack of splice trays.

For the foregoing reasons, there is a need to provide a simple, inexpensive, and easy to use splice tray assembly. There is further a need to provide a splice tray assembly which can be easily connected to an adjoining splice tray to maintain a stack of splice trays within a closure while providing convenient access to each splice tray in the stack.

SUMMARY

The present invention is directed to an apparatus that satisfies the above noted needs.

In accordance with a preferred embodiment, the present invention provides a fiber optic splice tray adapted for connecting to a second splice tray in a compact manner. The splice tray further provides easy access to the second tray, or additional trays configured below, while maintaining the connection between the trays. More specifically, the splice tray includes a generally elongate casing having two generally parallel side walls, first and second generally arcuate end walls and a generally planar base. The side walls and end walls preferably extend substantially perpendicular to the base. The splice tray includes means for laterally connecting to a second splice tray in a manner which permits the first splice tray to pivot "upward" about a lateral end axis, formed generally parallel to a first end of the second splice tray, after the two trays are attached, to provide access to the second tray. To enable this pivoting, the means for laterally connecting is formed at a first end of the casing proximate a first end of each side wall. The means for laterally connecting has an open position adapted to engage the second splice tray and a closed position wherein the means for laterally connecting lies co-planar with the base. This facilitates compact stacking of multiple trays.

In a further aspect, the splice tray of the present invention may further include second means for laterally connecting to a second splice tray integrally formed at a second end of said casing proximate a second end of each side wall to permit the first splice tray to pivot about an axis formed at a second end of the second splice tray. The first splice tray thus may be pivotally connected, by said means for laterally connecting or said second means for laterally connecting, to either end of the second splice tray.

In another embodiment, the splice tray of the present invention may include means for longitudinally connecting to a second splice tray in a manner which permits the first splice tray to pivot "upward" about a longitudinal side axis, formed generally parallel to a first side of the second splice tray, after the two trays are attached, to provide access to the second tray. To enable this pivoting, the means for longitudinally connecting is formed at a first side wall of the casing. The means for longitudinally connecting has an open position and a closed position.

In a further aspect, the splice tray of the present invention may further include a second means for longitudinally connecting to a second splice tray integrally formed at a second side wall of the casing to permit the first splice tray to pivot about an axis formed at a second side wall of the second splice tray. The first splice tray thus may be pivotally connected, by said means for longitudinally connecting or said second means for longitudinally connecting, to either side of the second splice tray.

In a further aspect the splice tray may include at least two means for longitudinally connecting or at least two second means for longitudinally connecting to provide additional connection stability and strength.

In yet another embodiment, the splice tray of the present invention may include cover retention tabs integrally formed in the side walls and a removable cover. The cover retention tabs retain the cover between the retention tabs and a fiber retaining means secured to the side wall. The cover further includes notches adapted to receive the retention cavity of the means for longitudinally connecting to prevent the cover, once installed, from laterally shifting.

In another embodiment the splice tray of the present invention includes a splice tray alignment system including a means for aligning a first splice tray and a second splice tray. The means for aligning is integrally formed in the base of the splice tray as an alignment boss extending generally perpendicularly from the base. The alignment boss includes alignment sleeve adapted to receive an alignment guide. The alignment guide has two ends which may be secured together. Therefore, first and second splice trays may be aligned and an alignment guide may be threaded through the respective alignment guides and secured in a loop to maintain the alignment of the splice trays to facilitate handling of multiple, stacked, splice trays.

In a further aspect, the splice tray alignment system of the present invention includes a mounting platform and an alignment guide secured to the mounting platform. In this aspect trays may be installed onto the mounting platform by threading one or more alignment means of each subsequent tray over one or more alignment guides, as provided. Each splice tray in the stack is easily accessed by pivoting the trays higher in the stack out of the way along the alignment guides.

In another embodiment the present invention provides, in a fiber optic splice tray for storing spliced ends of optical fibers from a first and a second buffer tube, each buffer tube including at least one optical fiber, a means proximate an end wall for securing a buffer tube to the splice tray. The means for securing a buffer tube securely retains the buffer tube while minimizing pressure on the buffer tube. The means for securing a buffer tube includes a buffer tube receiving channel formed from the base of the splice tray, a channel wall, and a buffer tube retainer secured to the base of the splice tray proximate the channel wall. A buffer tube may be resiliently retained in the buffer tube receiving channel formed by the base, the channel wall and the buffer tube retainer. The buffer tube receiving channel can retain at least two buffer tubes or a single ribbon cable, which has a significantly larger dimension than a typical buffer tube.

In yet another embodiment, the present invention provides, in a fiber optic splice tray for storing spliced ends of optical fibers from a first and a second buffer tube, each buffer tube including at least one optical fiber, a means for dressing optical fibers in the splice tray to organize the optical fibers and maintain a minimum bend radius. The means for dressing optical fibers permits a wide variety of fiber optic dressing configurations. The means for dressing optical fibers includes an insert means which is removably secured to the base and a means for retaining the insert means comprising a generally circular insert retention socket integrally formed as an aperture in the base.

In still another embodiment, the present invention provides, in a fiber optic splice tray for storing spliced ends of optical fibers from a first and a second buffer tube, each buffer tube including at least one optical fiber, a means for securing a splice within the splice tray. The means for securing a splice permits the splice to be securely retained and protected anywhere on the base of the splice tray. The means for securing a splice is removably secured within the splice tray. In another aspect the means for securing a splice includes an insert means removably secured to the base and means for retaining the insert means.

In another embodiment, the present invention includes a system for mounting a fiber optic splice tray to a tier bracket. The system includes a tier bracket having a pair of apertures, a splice tray casing, and a tier bracket hinge assembly integrally formed at one end of the splice tray casing. The tier bracket hinge assembly may be easily secured to the tier bracket so as to permit the splice tray to pivot about an axis formed by the connection to the tier bracket at the tier bracket apertures. The tier bracket hinge assembly of the present invention may further include a scored area proximate the junction with the casing to permit the tier bracket hinge assembly to be easily removed from the casing, if it is not required, without damaging the remainder of the casing.

In yet another embodiment, the present invention provide a fiber optic splice tray including a means formed in the splice tray for removably interlocking a splice tray and a second splice tray. The interlocking means permits splice trays to be easily stacked while preventing significant longitudinal or lateral movement. The means for interlocking includes a tongue integrally formed as a coplanar extension of the sidewall of the splice tray and a groove integrally formed in the side wall directly beneath the tongue adapted to receive a tongue from a corresponding splice tray.

In still another embodiment, the present invention provides a fiber optic splice tray which may be provided in a great variety of configurations to satisfy the many needs of the telecommunications community. The splice tray for storing spliced ends of optical fibers from a first and a second buffer tube, each of which includes a plurality of optical fibers, includes a casing having two side walls, first and second end walls and a base. The side walls and end walls extend substantially perpendicularly from the base and have free edges defining generally a plane formed with optical fiber retaining means projecting inwardly therefrom and spaced from said base for receiving and retaining lengths of optical fibers positioned along the side walls and the end walls. The splice tray further includes at least one of the following, none of which mechanically interferes with the other (so that a second tray identically equipped may lay flat, after installation, on top of a first tray, and a third tray on top of a second, etc., for example) although present on the splice tray: a lateral pivot assembly having an open position and a closed position; a longitudinal hinge assembly having an open position and a closed position; an alignment boss having an alignment sleeve adapted to receive an alignment guide; a buffer tube receiving channel comprising a portion of the base, a buffer tube retainer secured to the base, and a channel wall for resiliently retaining a buffer tube; an insert assembly having an insert for dressing an optical fiber splice and an insert retention socket; an insert assembly having an insert for retaining an optical fiber splice and an insert retention socket adapted to receive the insert assembly; and an interlocking assembly having a tongue integrally formed as a coplanar extension of the sidewall and a groove integrally formed in the side wall directly beneath the tongue and adapted to receive a tongue from a corresponding splice tray.

Accordingly, it will be appreciated that the present invention provides an improved splice tray assembly which may be used to increase the splice carrying capacity of a single splice tray and correspondingly increase the capacity of a stack of splice trays. The improved splice tray assembly secures buffer tubes to the splice tray while exerting less force on the optical fiber within the buffer tube. The simplified splice tray assembly provides such improvements while simplifying the manufacturing process and thereby reducing the cost of manufacturing a splice tray, and the resulting assembly may be used with a wide variety of existing splice closures. It will be further appreciated that the present invention provides a splice tray assembly which can be easily connected or aligned with adjoining splice trays to maintain a stack of splice trays within a closure which provides convenient access to each splice tray in the stack.

A more complete understanding of the improved splice tray assembly will be afforded to those of ordinary skill in the art, as well as a realization of additional advantages and objects thereof, by a consideration of the following detailed description of the preferred embodiment. Reference will be made to the appended sheets of drawings which will first be described briefly.

BRIEF DESCRIPTION OF THE DRAWINGS

FIG. 3 is a top perspective detail view of the lateral pivot assembly of the present invention in the closed position.

FIG. 4A is a top perspective detail view of connected lateral pivot assemblies of a stack of splice trays of the present invention.

FIG. 4B is a top perspective detail view of connected lateral pivot assemblies of a stack of splice trays of the present invention in which the top splice tray in the stack of splice trays is raised.

FIG. 7 is a top perspective detail view of the longitudinal hinge assembly of the present invention in the open position.

FIG. 8A is a top perspective detail view of connected longitudinal hinge assemblies of a stack of splice trays of the present invention.

FIG. 8B is a top perspective detail view of connected longitudinal hinge assemblies of a stack of splice trays of the present invention in which the top splice tray in the stack of splice trays is raised.

FIG. 9 is a side view of a stack of splice trays which are aligned using an alignment boss of the present invention in which the top splice tray is raised on its end to reveal an underlying splice tray.

FIG. 10 is an end view of a stack of splice trays which are aligned using an alignment boss of the present invention in which the top splice tray is raised on its end to reveal an underlying splice tray.

FIG. 11 is a top perspective detail view of the alignment bosses of the present invention.

FIG. 12 is an end view of a stack of splice trays which are aligned using an alignment boss of the present invention in which the top splice tray is raised on its side to reveal an underlying splice tray.

FIG. 13 is a top perspective detail view of the buffer tube receiving channels of the present invention.

FIG. 14 is a top perspective detail view of the buffer tube receiving channels of a stack of splice trays of the present invention.

FIG. 15 is an end view of the buffer tube receiving channels of the present invention.

FIG. 16 is a top view of a splice tray of the present invention illustrating the inserts and insert retention sockets of the present invention.

FIG. 17 is a top detail view of an insert retention socket of the splice tray of the present invention.

FIG. 18 is a side cross-sectional view of an insert retention socket of the splice tray of the present invention taken along the line 18—18 from FIG. 17.

FIG. 19 is a top detail view of an insert retention socket of the splice tray of the present invention having an insert blank inserted therein.

FIG. 20 is a side cross-sectional view of an insert retention socket of the splice tray of the present invention having an insert blank inserted therein taken along the line 20—20 from FIG. 19.

FIG. 21 is a bottom detail view of an insert blank of the splice tray of the present invention.

FIG. 26 is a top view of a splice tray of the present invention illustrating a representative optical fiber routing using limiter-type inserts.

FIG. 30 is a top view of a splice tray of the present invention illustrating a break-away tier bracket hinge and an interlocking assembly.

FIG. 31 is a side view of a splice tray of the present invention illustrating a break-away tier bracket hinge and an interlocking assembly.

DETAILED DESCRIPTION

Figure 1:
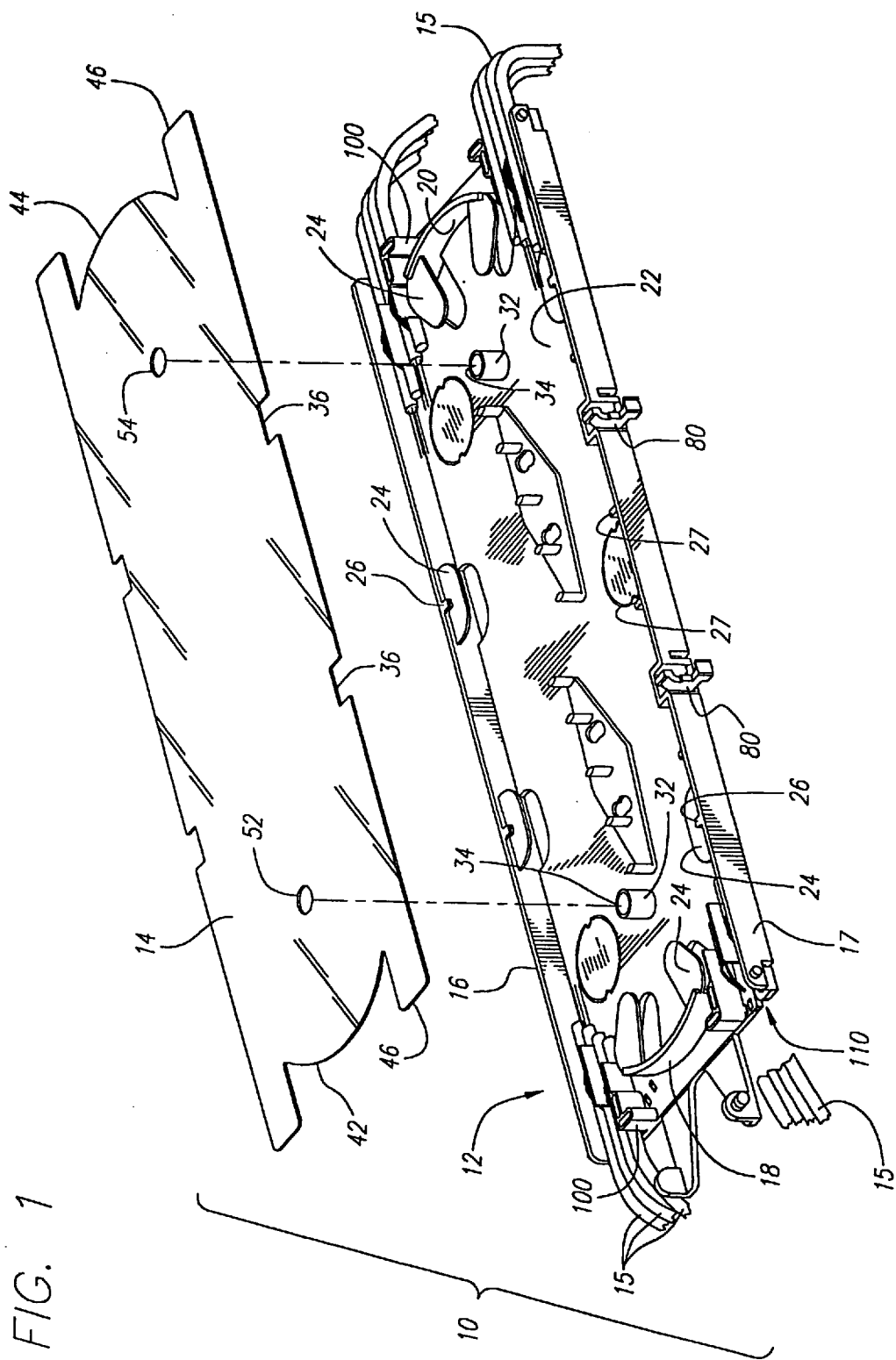
FIG. 1 is a top perspective view of a splice tray of the present invention.

A detailed description of the present invention will now be presented in conjunction with the embodiment of the present invention illustrated in FIGS. 1–32, wherein like reference numbers refer to like elements. It is to be understood that the present invention is in no way limited to the embodiment shown in the drawings.

A fiber optic splice tray in accordance with a preferred embodiment of the present invention is shown in FIG. 1. The splice tray 10 comprises a casing 12 and a cover 14. Each tray can preferably accommodate a large number of splices, for example, from one to 70 splices, or more, depending on the configuration of the optical fiber cable and cable dressing. The tray stores the respective slack fiber with maximum organization in a minimum amount of space without subjecting the fibers to excessive stress. Each tray can accept a number of buffer tubes 15, for example, preferably at least 36 buffer tubes, depending on the size of each respective buffer tube and how each buffer tube is secured.

The casing 12 is preferably a single integrally molded structure and comprises two generally parallel spaced side walls 16 and 17, first and second arcuate end walls 18 and 20, and a generally planar base 22. The casing 12 is composed of a dielectric material, suitable for manufacture in the desired shape. For example, any one of several commercially available thermoplastic resins may be readily employed due to their relatively low cost and ease of manufacture. Other dielectric materials may also be employed, however. The side walls 16 and 17 and the end walls 18 and 20 have a plurality of inner generally parallel fiber retention tabs 24 which are integrally formed and extend generally from the side walls 16 and 17, and end walls 18 and 20 towards the center of the casing 12. The fiber retention tabs 24 serve to retain the fibers within the splice tray between the base 22 and the fiber retention tabs 24. The height between the base 22 and the fiber retention tabs 24 is sufficient to permit routing of larger-diameter optical fibers and especially, ribbon cables having 12 fibers, within the splice tray. The fiber retention tabs also provide a support for the cover 14.

The side walls and the end walls have free edges opposite the base 22, defining generally a plane at the upper open side of the casing 12. About the periphery of the open side corresponding to each of the fiber retention tabs 24 integrally formed with the side walls 16 and 17 are formed four cover retention tabs 26. A space is provided between each fiber retention tab 24 and each cover retention tab 26 sufficient to permit the cover 14 to be retained therein. The splice tray also comprises a plurality of buffer tube receiving channels 110 for retaining the buffer tubes 15 as will be described further below.

The splice tray 10 comprises two mounting bosses 32 for mounting the splice tray to a mounting platform or for bolting adjacent splice trays together as will be discussed further below. Each mounting boss 32 is integrally formed perpendicular to the base 22, and has a circular cross-section with a substantially round through-hole 34 through which a fastener may be inserted for mounting the splice tray 10 to a mounting platform. The top of each mounting boss 32 is substantially the same height from the base 22 as the fiber retention tabs 24. Therefore, when the cover 14 is in-place on top of the splice tray, the central portion of the cover can be supported by the mounting bosses 32.

The cover 14 of the splice tray 10 generally corresponds in shape to the side walls 16 and 17 and the end walls 18 and 20 of the casing 12. Thus, in the illustrated embodiment cover 14 has a generally rectangular shape as does casing 12. Preferably, the cover may be formed of a flexible, substantially clear plastic which permits easy installation between the fiber retention tabs 24 and the cover retention tabs 26 while allowing a technician to easily view the interior of the covered casing 12 without removing the cover 14. Alternatively, the cover 14 may be formed of the same rigid, plastic material used in manufacturing the casing 12.

The cover 14 includes a number of notches or cut-outs to ensure the cover will not interfere with any of the features of the splice tray 10. For example, the cover 14 has notches 36 on either side to permit proper operation of the longitudinal hinge assembly 80 to be discussed further below. Further, the cover has substantially arcuate ends 42 and 44 which correspond to the end walls 18 and 20. The cover further comprises area 46 in each corner which corresponds to the buffer tube receiving channels 110 so as to cover and protect each of the buffer tubes 15 in each of the buffer tube receiving channels 110, while leaving uncovered the splice tray alignment bosses 100 to be described further below. The cover 14 also comprises circular holes 52, 54 which correspond to the through-holes 34 provided in the mounting bosses 32. Therefore, adjacent covered splice trays 10 may be bolted together using their respective mounting bosses 32 without interference from the cover 14.

The casing 12 may be covered with the cover 14 by inserting the cover into place between the fiber retention tabs 24 and the cover retention tabs 26. The cover is preferably formed of a suitably flexible plastic such that the cover may be deformed and snapped into place between the fiber retention tabs 24 and the cover retention tabs 26. The cover provides substantial protection for the optical fibers within the splice tray 10. In addition, the cover acts as a top wall for the casing such that each of the elements in the casing, such as the mounting bosses 32, for example, are generally fabricated to match the height of the cover 14 from the base 22 such that any optical fibers within the casing are captured between the base 22, the cover 14 and any other intermediate elements such as the mounting bosses 32 and other elements to be described further below.

The base 22 of the splice tray has many openings which are provided for ease of manufacture. However, once the splice trays 10 are stacked, as illustrated in FIG. 2, the combination of the casing 12 and the cover 14 provides significant protection for the optical fibers and splices within the splice trays 10 because the cover from the splice tray below substantially covers the openings in the base of the splice tray above.

Figure 2:
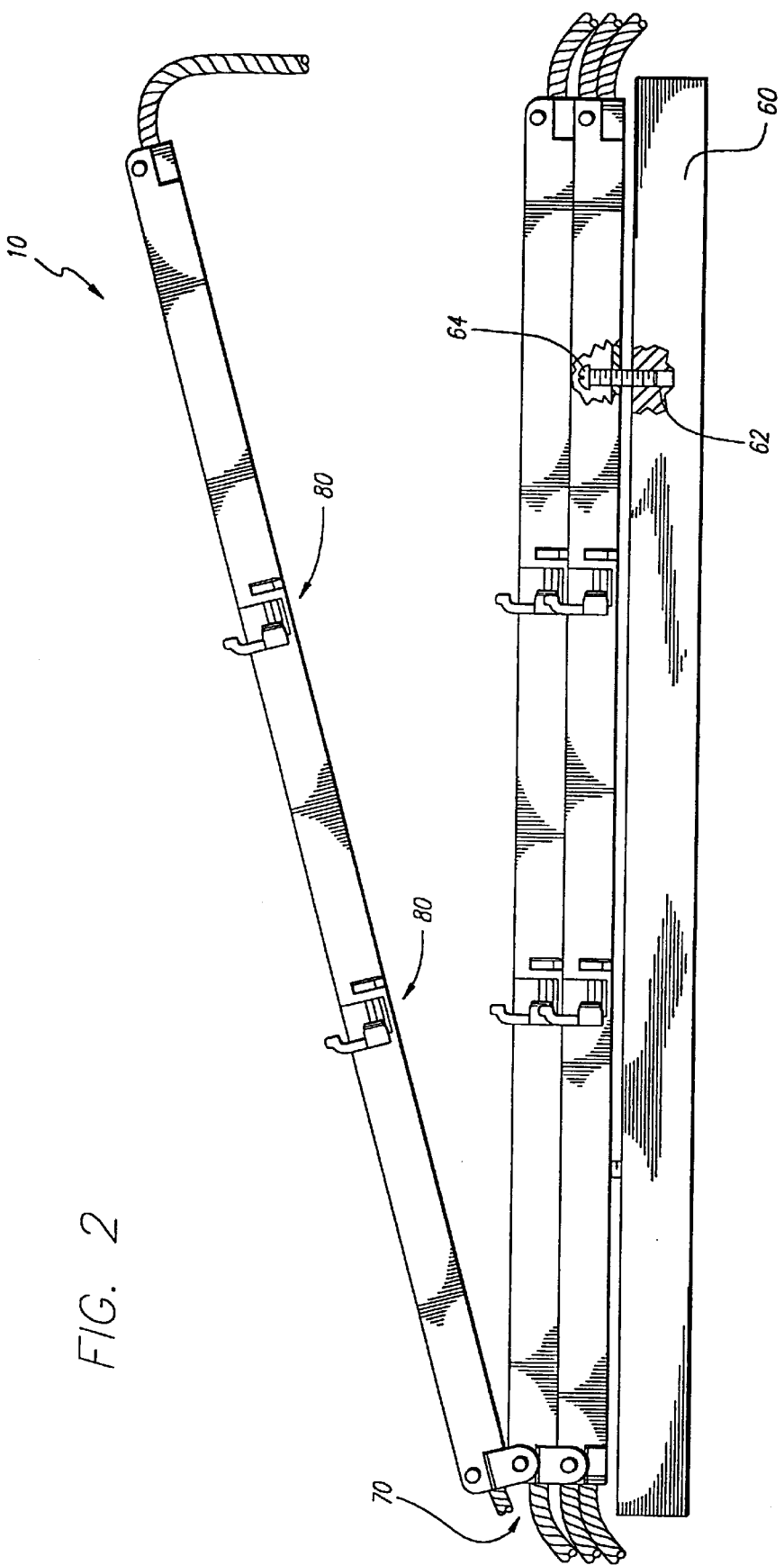
FIG. 2 is a side view of a stack of splice trays which are connected together using a lateral pivot assembly of the present invention.

As illustrated in FIG. 2, splice trays 10 may be provided in a stacked configuration to provide the maximum splicing capacity within a closure. The stack may be mounted on a mounting platform 60 to provide a stable working place for the technician and to provide a secure location for the splice trays. The mounting platform 60 is generally secured to the inside of the corresponding closure by a mounting bar connected to end plates or to the closure walls themselves. Once securely mounted within a closure, the splice trays and the splices held within the splice trays are subject to less shock and vibration from environmental hazards such as the high winds which may be experienced in an aerial installation, for example.

The splice trays 10 may be secured to the mounting platform 60 in any number of ways. The splice trays 10 may be secured together and the entire stack secured to the mounting platform by a long strip of industrial strength hook-and-eye fastener such as VELCRO. If intermediate splice trays in the stack are made accessible by a connecting mechanism, it is preferable to secure the bottom splice tray in the stack directly to the mounting platform 60, as shown in FIG. 2, to serve as a base for the stack of splice trays. As further illustrated in FIG. 2, a mounting hole 62 is provided in the mounting platform 60 which corresponds to the mounting bosses 32 in the splice tray 10. The mounting bosses 32 of the splice tray 10 may be secured to the mounting platform 60 with a bolt or equivalent fastener 64. Once the bottom splice tray is secured to the mounting platform, a variety of mechanisms may be provided to secure the remaining splice trays to each other and the bottom splice tray.

FIG. 2 is a side view of a stack of splice trays 10 secured to a mounting platform 60 showing the splice trays connected at one end by the lateral pivot assembly 70. The lateral pivot assembly 70, as further detailed in FIGS. 3, 4A and 4B, may be provided at either or both ends of the splice tray to permit a plurality of splice trays to be stacked one above the other to provide a plurality of splice trays 10 in a closure.

Each lateral pivot assembly 70 comprises a connecting pin 72 and a pin retainer 74. The connecting pin 72 is generally cylindrical, extending perpendicularly from an end of the side wall 17 and is integrally formed with the side wall 17. The pin retainer 74 is integrally formed with the side wall 17 corresponding to the connecting pin 72. Each pin retainer 74 is provided with an opening 76 for retaining a corresponding connecting pin 72.

The pin retainer 74 is movable between first and second positions, i.e., a first closed position and a second closed position. In the closed position, as illustrated in FIG. 3, the pin retainer 74 lies parallel with the splice tray base and perpendicular to the side wall 17. The pin retainer 74 is integrally formed with the side wall 17 with a hinge which permits the pin retainer 74 to be moved into an open position as needed, as shown in the upper splice trays in FIGS. 4A and 4B. In the open position the pin retainer 74 has been swiveled on its hinge to extend parallel to the side wall 17, but not coplanar with the side wall 17, to which it is attached. Once extended, the pin retainer 74 is coplanar with the connecting pin 72 of a lower, adjacent splice tray and the pin retainer 74 may be snapped in-place to capture the connecting pin 72 of the lower, adjacent splice tray. Preferably a lateral pivot assembly 70 is provided at each end of each side wall 16 and 17 to permit adjacent splice trays 10 to be pivotally connected together at either end.

In operation, a first splice tray 10 is secured to the mounting platform 60 with one or more fasteners 64. A second splice tray having a pair of lateral pivot assemblies 70 at one end of the splice tray is secured to the first splice tray by opening the pair of pin retainers 74 and lowering the splice tray over the first splice tray to capture the connecting pins 72 of the first splice tray in the pin retainers 74 of the second splice tray. An additional splice tray 10 may be added to the second splice tray, and so on, until the closure has enough splice trays 10 to meet the desired optical fiber splice capacity. In practice, the technician will add splice trays to the stack as additional capacity is required. In addition, the splice trays may be connected at either end, depending upon where the technician has the most clearance considering the working conditions.

In order to gain access to a specific tray, those trays above the desired tray may simply be pivoted about the axis at the connected end of the splice trays and flipped up to stand on their ends to move them out of the way. The technician can work on the desired splice tray securely mounted on the mounting platform, via the lateral pivot assemblies 70 of any intervening splice trays 10. When the technician is finished, the lifted trays may be flipped-down, back into place, and the stack secured with a strap of VELCRO. In the alternative, the splice trays 10 could be connected by lateral pivot assemblies 70 at both ends to secure all the splice trays in the stack with a bottom splice tray which is connected to the mounting platform 60 to form a secure unit without the assistance of any additional fasteners.

Figure 5:
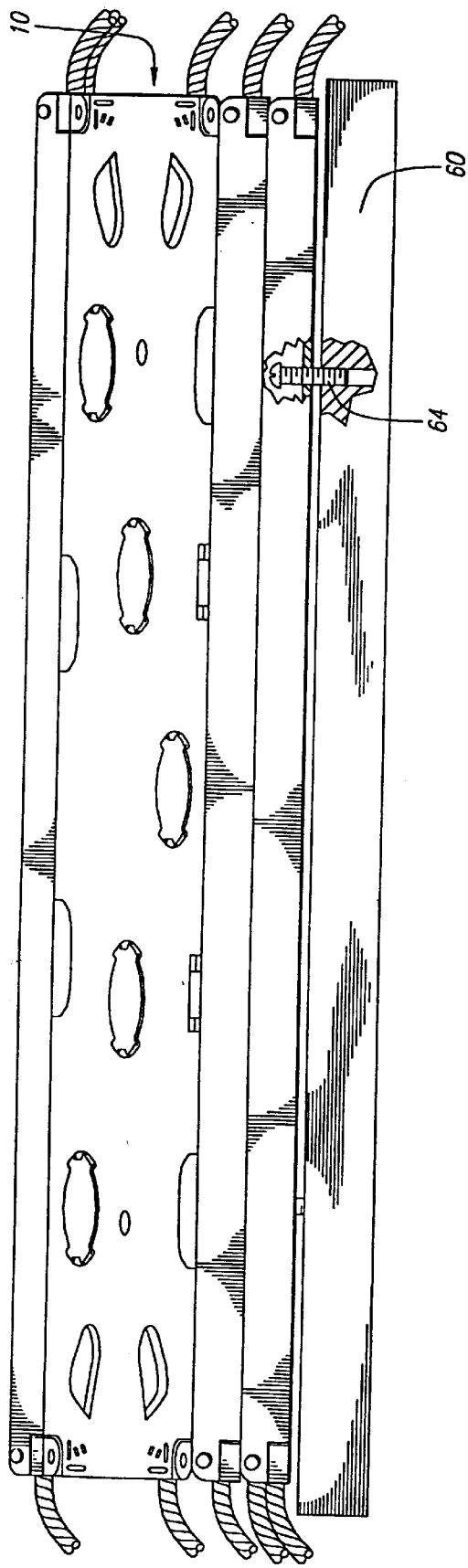
FIG. 5 is a side view of a stack of splice trays which are connected together using a longitudinal hinge assembly of the present invention in which the top splice tray is raised to reveal an underlying splice tray.
Figure 6:
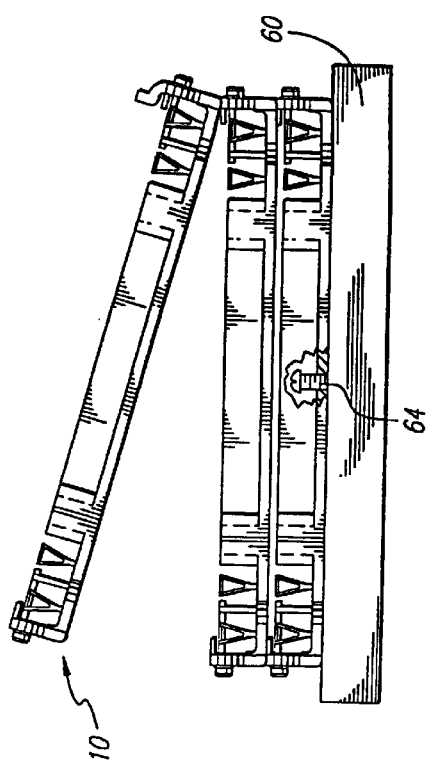
FIG. 6 is an end view of a stack of splice trays which are connected together using a longitudinal hinge assembly of the present invention in which the top splice tray is raised to reveal an underlying splice tray.

FIGS. 5 and 6 show a stack of splice trays 10 connected along one side by a longitudinal hinge assembly 80 (as shown in FIG. 2). FIG. 2 illustrates a pair of longitudinal hinge assemblies 80 formed along one side wall of each splice tray. One or more longitudinal hinge assemblies 80 may be provided along a side wall to connect stacked splice trays. Preferably, a pair of longitudinal hinge assemblies 80 are used to connect a stack of splice trays. The longitudinal hinge assembly 80, as further detailed in FIGS. 7, 8A and 8B, may be provided along either or both sides of the splice tray to permit a plurality of splice trays to be stacked one above the other to provide a plurality of splice trays in a closure. If there is limited horizontal clearance within which to work, for example, the technician may choose to connect the splice trays via the longitudinal hinge assemblies 80 instead of via the lateral pivot assemblies 70.

Each longitudinal hinge assembly 80 is preferably integrally formed with the casing 12 and of the same material as the casing 12. Each longitudinal hinge assembly 80 comprises, in general, a retention cavity 82 and a locking tab keeper 84, which are cavities formed integrally with the side wall 17, and a pivot bar 86. The pivot bar 86 is generally cylindrical and extends across the retention cavity 82 proximate the junction of the side wall 17 and the base 22.

The longitudinal hinge assembly 80 also comprises a hinge assembly 88 which is integrally and pivotally formed with the side wall 17. The hinge assembly 88 has a closed position and an open position. In the open position, as illustrated in FIG. 7, the hinge assembly 88 extends perpendicular to the side wall 17. The hinge assembly 88 is integrally formed with the side wall 17 with a hinge which permits the hinge assembly 88 to be moved into a closed position as needed, as shown in FIGS. 8A and 8B. In the closed position, the hinge assembly 88 has been swiveled on its hinge such that elements of the hinge assembly 88 are captured in the retention cavity 82 and the locking tab keeper 84 to secure an upper splice tray to a lower splice tray.

The hinge assembly 88 is used in locking together adjacent splice trays and comprises multiple integrally formed surfaces including a locking tab 90, a pivot guide 92, a hinge assembly tab 94 and a hinge assembly retainer 96. The pivot guide 92 from a first splice tray provides a rounded surface which corresponds to the pivot bar 86 of a second splice tray directly above the first splice tray. This pivot guide 92 is retained in place by the combination of the hinge assembly tab 94 from the first splice tray and the hinge assembly tab retainer 96 from the second splice tray directly above the first splice tray. In order to lock the hinge assembly 88 in the closed position, which also locks the hinge assembly retainer 96 in-place, the hinge assembly 88 is snapped into the closed position whereby the locking tab 90 is captured by the locking tab keeper 84. The hinge assembly tab 94 and the pivot guide 92 of the hinge assembly 88 reach above the plane formed by the tops of the side walls in order to reach the connective elements in the splice tray above. Therefore, the cover 14 includes notches 36 corresponding to these elements so that the cover 14 will not interfere with the proper operation of the longitudinal hinge assembly 80.

FIG. 5 shows a side view of a stack of two splice trays 10 which have been connected using a longitudinal hinge assembly 80 (as best illustrated in FIG. 2) and FIG. 6 shows an end view of a stack of three splice trays 10 which have been connected using a longitudinal hinge assembly 80. A first splice tray 10 is secured to the mounting platform 60 with one or more fasteners 64.

As best illustrated in FIGS. 7, 8A and 8B, a second splice tray having a pair of longitudinal hinge assemblies 80 along one side wall 17 of the splice tray 10 is secured to the first splice tray by pivoting the hinge assembly 88 of the first, or lower, splice tray into the closed position to capture the pivot bar 86 of the second tray behind the pivot guide 92 of the first splice tray. When closing the hinge assembly 88 of the first splice tray, the locking tab 90 of the first splice tray is captured and retained by the locking tab keeper 84 of the first splice tray to maintain the hinge assembly 88 in the closed position.

To secure the second splice tray to the first splice tray, the hinge assembly 88 of the second, or upper, splice tray is then pivoted and snapped into the closed position. When the upper tray hinge assembly 88 is closed, the hinge assembly tab 94 from the first, or lower, splice tray is captured by the hinge assembly tab retainer 96 from the second splice tray. Thus, the first and second splice trays are connected to each other such that the first splice tray is mounted to the mounting platform while the second splice tray is free to swivel about the axis formed by the side wall 17 and the longitudinal hinge assembly 80 or, more particularly, about the pivot bar 86. An additional splice tray 10 may be added to the second splice tray, and so on, until the closure has enough splice trays 10 to meet the desired optical fiber splice capacity. In practice, the technician will add splice trays to the stack as additional capacity is required. In addition, the splice trays may be connected on either side by merely rotating the entire trays by 180° prior to installing the splices (not shown), depending upon where the technician has the most clearance considering the working conditions.

In order to gain access to a specific tray, those trays above the desired tray may simply be pivoted about the axis formed by the pivot bar 86 (shown in FIG. 7) at the connected side of the splice trays and flipped up together to stand on their sides to move them out of the way. The technician can work on the desired splice tray which is securely mounted on the mounting platform via the longitudinal hinge assemblies 80 of the intervening splice trays 10. When the technician is finished, the lifted splice trays 10 may be flipped-down, back into place, and the stack secured with a strap of VELCRO. In the alternative, the splice trays 10 could be connected by longitudinal hinge assemblies 80 at both sides to secure all the splice trays in the stack with a bottom splice tray which is connected to the mounting platform 60 to form a secure unit without the assistance of any additional fasteners.

Splice trays 10 may also be aligned and secured using the splice tray alignment bosses 104 and 106 in cooperation with alignment guides 102 as illustrated in FIGS. 9–12. FIG. 11 illustrates, in detail, the splice tray alignment bosses 104 and 106. An alignment boss may be provided as a longitudinal alignment boss 106 or as a lateral alignment boss 104. For brevity, only a lateral alignment boss 104 will be described initially, although the longitudinal alignment boss 106 has substantially the same qualities and varies only in its orientation. Each alignment boss has the same purpose, to facilitate alignment and to secure splice trays, but each is oriented 90 degrees from the other to provide the technician the choice of flipping adjacent splice trays on their ends or on their sides while working on a selected splice tray in a stack of splice trays.

Each alignment boss 104 is preferably integrally formed perpendicular to the base 22 of the splice tray 10, and is of the same material as the casing 12. Alignment bosses 104 are preferably located in the corners of the casing 12 between the buffer tube receiving channels 110, to be described further below, and either end of the end walls 18 and 20. Each alignment boss is as high from the base 22 as the end walls 18 and 20 and has a through-hole which forms an alignment sleeve 108 in which an alignment guide 102 may be inserted. The alignment sleeve 108 may be circular. Preferably, however, the alignment sleeve has an oval cross-section with substantially parallel sides wherein the length of the oval is significantly longer than its width to provide greater lateral control over the splice tray 10 when in use with the alignment guides 102 as will be described further below. Further, the cover 14 does not cover the alignment bosses 104 so that alignment is not interfered with when the cover 14 is in-place on top of the splice tray 10.

The alignment guide 102 is preferably formed to have a cross-section substantially similar to the cross-section of each alignment boss 104. The alignment guide 102 is formed as an elongated tine which may be made of plastic or metal or any other material having the required qualities of flexibility and durability. As shown in FIG. 9, the alignment guide 102 may be secured to an end of the mounting platform 60. The alignment guide may be secured to the mounting platform by using any standard means such as an epoxy, a mechanical fastener such as a metal screw or bolt, or by welding the alignment guide 102 to the mounting platform 60. The orientation of the alignment guides 102 on the mounting platform 60 varies depending on how the user wants to align the splice trays as will be discussed further below. The other end of the alignment guide 102 is generally free for insertion into an alignment boss 104.

The range of flexibility in an alignment guide 102 is wide in that users may prefer an alignment guide 102 which is rigid or flexible. For example, a user may decide to use a standard twist-tie or tie-wrap as an alignment guide simply to maintain the stack of splice trays in a generally orderly condition. In this instance, the alignment guide may not by secured to the mounting platform 60. Another user may have specifications requiring splice trays to be mounted and secured such that the splice trays are exposed to limited agitation. In this instance, the user may opt for a pair of very rigid alignment guides which are secured to the mounting platform as shown in FIG. 9 so as to minimize lateral movement in the splice trays.

In operation, a pair of alignment guides 102 are secured to the mounting platform 60. In the case of using the lateral alignment bosses 104 which permit the technician to flip the splice trays about the end of the splice tray, a pair of alignment guides 102 are secured to one end of the mounting platform 60 as shown in FIGS. 9 and 10, corresponding to the alignment bosses 104 to be used. The alignment guides 102 may then be inserted into the corresponding lateral alignment bosses 104 of a first splice tray 10, and the first splice tray may be secured to the mounting platform 60 via the mounting bosses 32 using one or more fasteners 64. Additional splice trays 10 may be added to the stack of splice trays 10 using the alignment guides 102 and the lateral alignment bosses 104 until the closure has enough splice trays 10 to meet the desired optical fiber splice capacity. In practice, the technician will add splice trays to the stack as additional capacity is required.

In order to gain access to a specific tray, those trays above the desired tray may simply be raised on the alignment guides 102 and moved out of the technician's way. The technician can work on the desired splice tray securely mounted on the mounting platform and as aligned with the alignment guides 102. If the alignment guides are rigid, the technician should experience little lateral movement in trays in which repairs are being effected, whereas if flexible alignment guides 102 are employed lateral movement in the trays may result. When the technician is finished, the raised trays may be returned to their initial position via the alignment guides 102 and the stack secured with a strap of VELCRO.

In the alternative, as shown in FIG. 12, in the case of using the longitudinal alignment bosses 106 which permit the technician to flip the splice trays about the side of the splice tray 10, a pair of alignment guides 102 are secured to one side of the mounting platform 60, corresponding to the alignment bosses 106 to be used. The alignment guides 102 may then be inserted into the corresponding longitudinal alignment bosses 106 of a first splice tray 10, and the first splice tray may be secured to the mounting platform 60 via the mounting bosses 32 using one or more fasteners 64. Additional splice trays 10 may be added to the stack of splice trays 10 using the alignment guides 102 and the longitudinal alignment bosses 106 until the closure has enough splice trays 10 to meet the desired optical fiber splice capacity. In practice, the technician will add splice trays to the stack as additional capacity is required and may secure the stack to the mounting platform using an industrial hook-and-eye fastener such as VELCRO.

Alternately, a single alignment boss may be provided in one or more corners of the splice tray, in the location as described above. In this alternative the alignment boss may be provided with a universal alignment sleeve having a substantially round or oblong cross-section such that it could be used for longitudinal alignment or lateral alignment, depending on the needs of the user. A mounting platform may be provided with alignment guides formed of substantially the same material as described with respect to alignment guides 102. The alignment guides are located on the mounting platform in correspondence with the alignment bosses and have a cross-section corresponding with that of the alternate alignment sleeve. This alternative alignment option provides control over the splice trays in a simplified alignment system.

As illustrated in FIGS. 13–15, the splice tray also comprises one or more buffer tube receiving channels 110 which may be provided between the side walls of the splice tray. In a preferred embodiment, four parallel buffer tube receiving channels 110 are provided in each corner of the splice tray 10. Each buffer tube receiving channel 110 is generally defined by a channel wall 112, the base 22, and a buffer tube retainer 114. The channel wall 112 and the base 22 are integrally formed with the casing 12 and are formed from the same material as the casing 12. Each channel wall 112, is formed integrally with the base 22 and rises perpendicular from the base 22 parallel with the side walls 16 and 17, to the same height as the end walls. The channel walls 112 which are adjacent the side walls 16 and 17 or the alignment bosses 104 and 106 share the same side wall or alignment boss structure. The channel walls which are between the side walls 16 and 17, and the alignment bosses 104 and 106 only extend into the splice tray 10 a short distance in accordance with the length of the buffer tube retainer 114.

The buffer tube retainer 114 is preferably integrally formed with the base 22 of the casing 12 and located between two channel walls 112. Therefore, each side of a buffer tube retainer 114 serves a different buffer tube receiving channel 110. Alternately, the buffer tube retainer 114 may be formed separately and secured to the base 22 with an available glue or epoxy suitable for forming a bond between the ends of the buffer tube retainer 114 and the base 22. In another alternative the buffer tube retainer 114 may be snapped into the base 22 and retained therein such that no lateral movement of the buffer tube retainer 114 is permitted. Any such movement of the buffer tube retainer 114 could limit the effectiveness of the buffer tube retainer in retaining buffer tubes 15.

As best illustrated in FIG. 13, the buffer tube retainer 114 has a gently arched silhouette which reaches its maximum height at the center. The maximum height of the buffer tube retainer 114 is slightly higher from the base 22 as two standard buffer tubes 15. From a top view, the buffer tube retainer 114 has a stretched hourglass shape formed of arcuate ribs 116 which are relatively thin and firm to form a compressive rib structure which will firmly yield to lateral pressure when the buffer tube retainer 114 is firmly secured to the base 22. The hourglass shape of the buffer tube retainer 114 reaches a maximum width at two locations, at each bulge in the hourglass, which occurs slightly below the maximum height.

The shape of the buffer tube receiving channel 110, formed by one side of a buffer tube retainer 114, combined with its location between channel walls 112 and the base 22, forms a means for securing a buffer tube including either one buffer tube or a stack of two standard buffer tubes, one on top of the other, in each buffer tube receiving channel 110. In the alternative, the buffer tube receiving channel 110 may be used to secure a single buffer tube for a larger cable, such as an optical fiber ribbon cable. The buffer tube receiving channels 110 retain the buffer tubes in the channels and effectively afford strain relief on the buffer tubes 15 to restrict pull-out of the buffer tubes 15. Due to the varying shape of the buffer tube retainer 114, buffer tubes 15 of varying sizes may be safely retained in the buffer tube receiving channels 110. The buffer tubes are retained without needing any extra tools or parts and the amount of pressure on the buffer tubes is controlled eliminating the possibility of inducing transmission losses due to overstressing of the fibers. Further, a pair of apertures may be provided in the base 22 proximate the opening of each buffer tube receiving channel adapted to receive a tie-wrap, for example, to further secure one or more buffer tubes 15 in the buffer tube receiving channel 110.

In operation, as best illustrated in FIG. 14, a buffer tube 15 containing optical fibers is positioned above a selected buffer tube receiving channel 110 and pushed into the gap between the top of the buffer tube retainer 114 and the channel wall 112. When the buffer tube is pushed into the gap, the buffer tube retainer 114 momentarily deforms and then substantially recovers its original shape as the buffer tube is captured between the buffer tube retainer 114 and the channel wall 112. If desired, a second buffer tube may be inserted above the first buffer tube to retain two buffer tubes in a single buffer tube receiving channel 110.

The splice tray 10 also comprises a provision for retention of additional buffer tubes using a buffer tube retention slot as illustrated in FIGS. 11 and 16. A buffer tube retention slot 119 may be provided in one or more of the four corners of the splice tray 10 between the end walls 18 and 20, and the splice tray alignment bosses 104 and 106. Each buffer tube retention slot 119 comprises two through-holes 120 in the base 22, and the area in the base 22 between the end walls 18 and 20 and the splice tray alignment bosses 104 and 106.

In operation, as best illustrated in FIG. 16, a buffer tube 15 containing optical fibers is positioned between the through-holes 120 and a tie-wrap is secured around the buffer tube and through the through-holes 120 to secure the buffer tube 15 to the base 22. An additional buffer tube, including oversized or undersized buffer tubes, may be secured in each corner of the splice tray 10 using the buffer tube retention slots 119 provided.

As illustrated in FIGS. 16–18, the base 22 of the splice tray 10 preferably comprises a plurality of spaced-apart insert retention sockets 124. The insert retention socket is used to retain an insert which may be provided in a variety of configurations to aid in optical fiber dressing within the splice tray 10 and for splice retention as will be described further below. The insert retention socket 124 is generally circular and integrally formed with the base 22 and formed of the same material as the casing 12. As best illustrated in FIGS. 17 and 18, the insert retention socket 124 preferably comprises a pair of insert retention guides 126 located in the top portion of the socket located closest to the inner surface of the base 22 and a pair of insert retention ribs 128 located closest to the outer surface of the base 22. Alternately, a larger or smaller number of insert retention guides 126 and insert retention ribs 128 may be used which correspond to the insert design. Further, the insert retention socket may comprise any equivalent mechanical clamp or threaded flange to retain a corresponding insert of a complimentary form.

The insert retention guides 126 are radially extending semi-circular tabs extending towards each other and the center of the insert retention socket. The insert retention guides 126 are located approximately 180 degrees from each other and generally provide three functions. The insert retention guides 126 guide the insert to ensure the insert is correctly inserted into the insert retention socket 124. The insert retention guides 126 also assist in locking the insert in place once inserted and twisted into position. Finally, the insert retention guides 126 serve to retain the insert in place once the insert has been properly installed. At the same time, the insert retention socket permits an insert to be easily removed from an insert retention socket 124 and replaced by a technician as desired.

The insert retention ribs 128 are a pair of radially extending annular ribs which extend towards each other and the center of the insert retention socket. The insert retention ribs 128 are located approximately 180 degrees from each other and generally provide a seat for the bottom portion of the insert. Once the insert is in place in the insert retention socket 124, the bottom of the insert is flush with the bottom side of the casing 12. The insert retention guides 126 and the insert retention ribs 128 cooperate to capture the insert therebetween as will be described further below.

The casing 12 may use one or more insert retention sockets 124 and one or more inserts to provide a variety of splice tray 10 configurations to assist in splice tray dressing. Each insert has an insert base 130, which also may be used as an insert blank, as illustrated in FIGS. 19–21. The insert base 130 is circular with a configuration which is adapted to be received by the insert retention socket 124. The insert base 130 is manufactured of the same material as the casing 12 and is best described as an integrally formed upper disc 132 and lower disc 134 which are concentric such that the lower disc 134 is generally of a smaller diameter than the upper disc 132.

The lower disc 134 corresponds generally to the insert retention ribs 128 in the bottom portion of the insert retention socket 124 in that the lower disc defines two long narrow flanges 136 which rest on the retention ribs 128 when the insert base 130 is inserted into the insert retention socket 124. The flanges 136 are longer than the annular ribs 128 to permit the insert base 130 to rotate a portion of a turn within the insert retention socket 124. The lower disc also comprises an insert retention tab 138 which extends radially from the lower disc to the general diameter of the insert retention socket 124. The insert retention tab 138 is used in retaining the insert base 130 in the insert retention socket 124 as will be discussed further below.

The upper disc 132 corresponds generally to the diameter of the top portion of the insert retention socket 124. The upper disc 132 further comprises a pair of locking tabs 140 disposed on either side of the upper disc 132 substantially 180 degrees from each other. Each locking tab 140 is recessed in that it does not extend to reach the full diameter of the insert retention socket 124, leaving a gap between the end of the locking tab 140 and the socket 124. Further, each locking tab 140 has a semi-circular notch 142 leaving a further gap between the upper disc 132 and the socket 124. Finally the upper disc 132 comprises a top surface to which various elements may be integrally formed or attached as will be further described below.

In operation, an insert base 130 may be secured in an insert retention socket 124 by first aligning the insert retention tabs 138 with the insert retention guides 126 and inserting the insert base 130 into the insert retention socket 124 in the unlocked position until the flanges 136 of the insert base 130 are resting on the insert retention ribs 128. The insert base may be turned until the insert locking tabs 140 slide past the insert retention guides 126. In this position, the insert retention tabs 138 of the insert base 130 have shifted to reside under the insert retention guides 126 such that the insert base 130 is retained in the insert retention socket 124 between the insert retention guides 126 and the insert retention ribs 128. The insert retention guides 126 prevent the insert base 130 from pulling out of the insert retention socket 124 and the insert locking tab 140, in cooperation with the insert retention guide 126, provides resistance against rotation once the insert base 130 is locked in place. The insert base 130 may be removed simply by twisting the insert base until the insert locking tabs 140 slide past the insert retention guides 126 to permit the insert base 130 to be lifted out of the insert retention socket 124.

An alternate retention scheme using an equivalent socket-fastener scheme having a threaded base, for example, or a different number of tabs and ribs, may be employed depending on the needs of the user. Further, the insert may be integrally formed with the base 22; or secured to the base 22 using an epoxy for permanent mounting; or may be removably secured using an industrial hook-and-eye fastener applied to each surface such as VELCRO.

Figure 22:
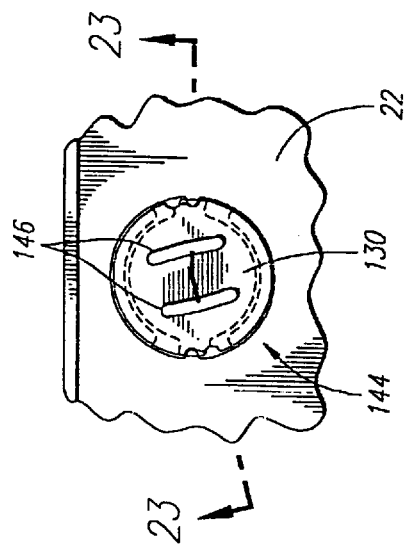
FIG. 22 is a top detail view of an insert retention socket of the splice tray of the present invention having a limiter-type insert retained therein.
Figure 23:
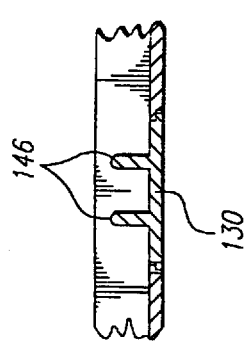
FIG. 23 is a side cross-sectional view of an insert retention socket of the splice tray of the present invention having a limiter-type insert retained therein taken along the line 23—23 from FIG. 22.

In an alternate embodiment, or in combination with the use of one or more insert bases 130, an alternate form of insert may be used to assist in optical fiber dressing and splice retention. As illustrated in FIGS. 22 and 23, an insert may further comprise a limiter-type insert 144 which comprises one or more mildly arcuate tabs 146 formed of the same material, integrally with, and perpendicular to the insert base 130. Each of the tabs 146 is preferably of the same height from the insert base as are the fiber retention tabs 24 from the base 22 such that the tops of the tabs 146 substantially meet the cover 14 when the cover is installed on the splice tray 10.

Figure 24:
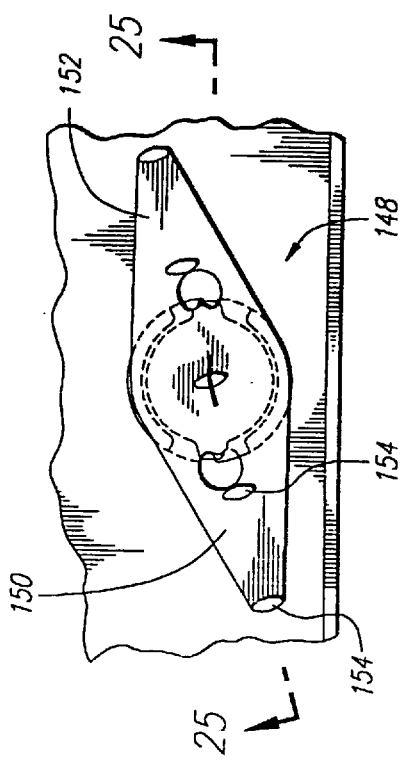
FIG. 24 is a top detail view of an insert retention socket of the splice tray of the present invention having a spigot-type insert retained therein.
Figure 25:
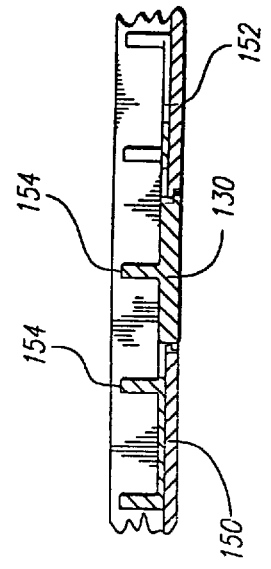
FIG. 25 is a side cross-sectional view of an insert retention socket of the splice tray of the present invention having a spigot-type insert retained therein taken along the line 25—25 from FIG. 24.

Another alternate embodiment of insert may comprise a spigot-type insert 148, as illustrated in FIGS. 24 and 25. A spigot-type insert 148 comprises an insert base 130 having two planar extended triangular arms 150 and 152 forming a generally oblong insert base with its major axis substantially parallel to the side walls. Each arm 150 and 152 may comprise one or more posts 154 formed of the same material, integrally with, and perpendicular to the arms 150 and 152. Each of the posts 154 has an oblong cross-section and, when installed, is of the same height from the base 22 as are the fiber retention tabs 24 from the base 22 such that the tops of the posts 154 substantially meet the cover 14 when the cover is installed on the splice tray 10.

Figure 27:
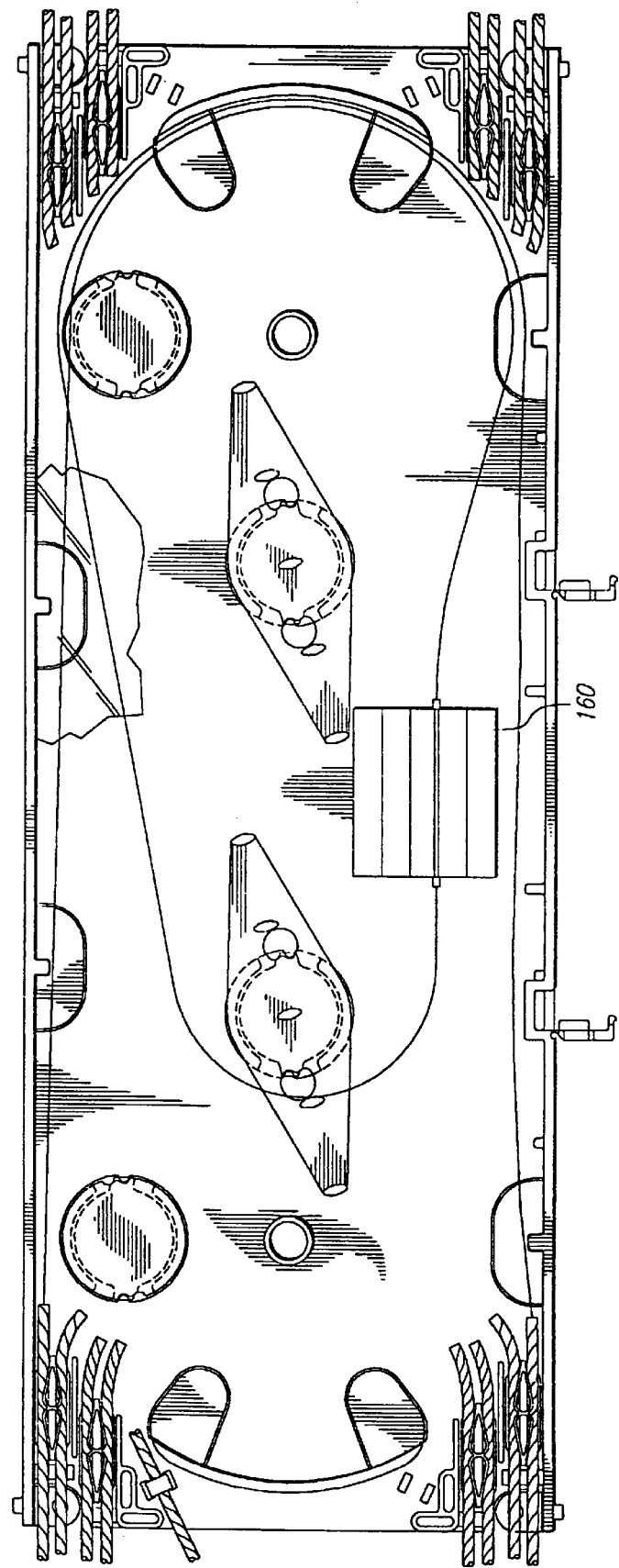
FIG. 27 is a top view of a splice tray of the present invention illustrating a representative optical fiber routing using spigot-type inserts.

The limiter-type insert 144 and the spigot-type insert 148 comprise only a few examples of the types of inserts which may be used by modifying the insert base 130 to assist the technician in proper optical fiber dressing to ensure optical fibers within a splice tray are properly retained and organized and are not bent beyond their minimum bending radius. Different schemes of fiber dressing also assist the technician in following optical fibers within a splice tray to locate needed optical fibers. Further, it is anticipated that inserts having one or more posts of one or more geometries may be provided to assist technicians in optical fiber dressing. Moreover, because the splice tray has sufficient depth, these same optical fiber dressing aids may be used in dressing optical fiber ribbon cables or oversized optical fibers. Examples of fiber dressing using certain of these types of inserts is illustrated in FIGS. 26 and 27.

In order to assist optical fiber dressing and to minimize the risk of damage to the optical fibers, side wall guides 27 may be provided adjacent the retention cavity wall 28 integrally formed on the side wall as shown in FIG. 26. Therefore, as the optical fiber is routed within the splice tray along the side wall having one or more longitudinal hinge assemblies 80, the optical fiber will not be formed to bend sharply around the longitudinal hinge assembly 80. Instead, it will be gradually eased away from the side wall and returned to the side wall via the side wall guides 27.

In operation, each of the inserts is interchangeable between each insert retention socket 124. Therefore, the splice tray 10 may be configured as desired, depending on the capacity needed in the splice tray and the techniques preferred by the technician.

Figure 28:
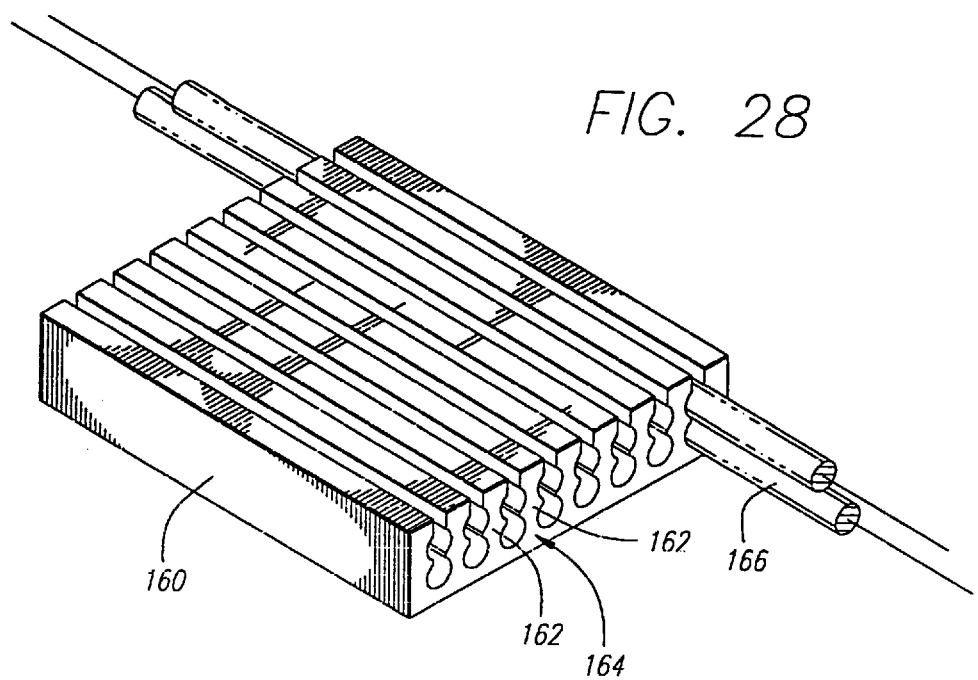
FIG. 28 is a top perspective view of a splice block-type insert of the present invention.
Figure 29:
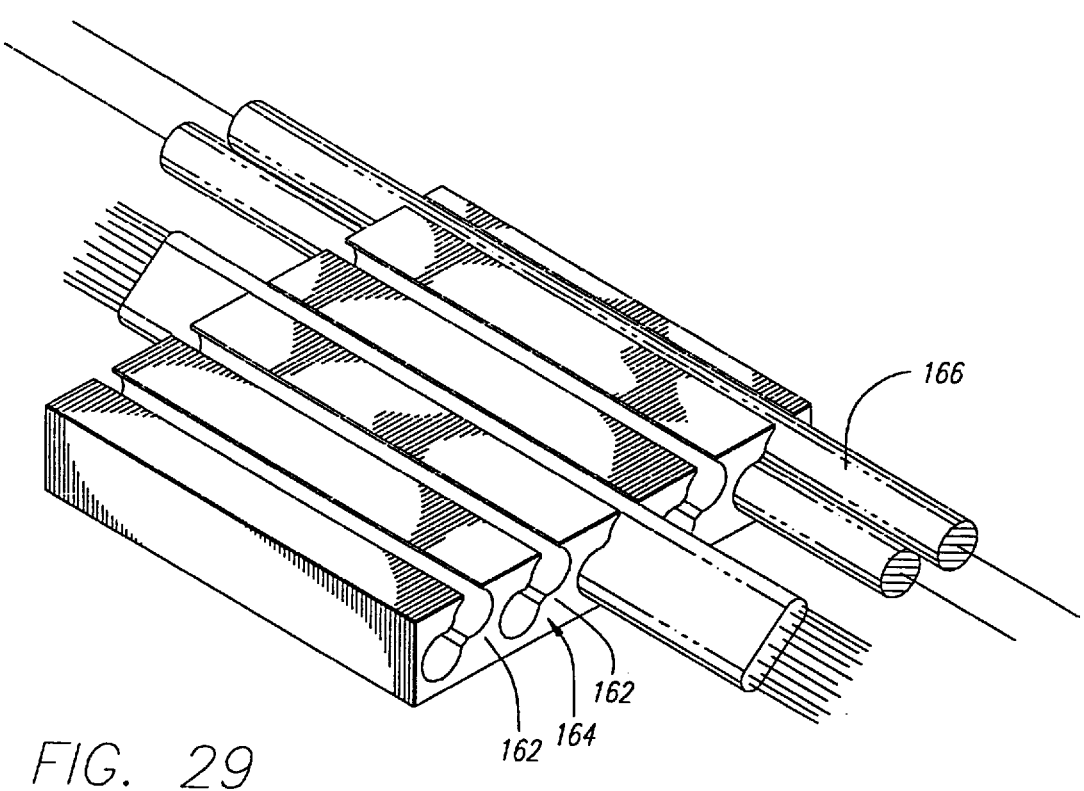
FIG. 29 is a top perspective view of another embodiment of a splice block-type insert of the present invention which holds larger-diameter splices.

The splice tray 10 further comprises a splice block 160 for retaining the splices in the casing 12 which splices are used to join the ends of the fibers in end-to-end abutting relationship. The splice block 160 has a series of walls 162 which define a series of channels 164 for receiving therein respective optical fiber splices 166 as shown in FIGS. 28 and 29. In order to accommodate larger-diameter splices, such as for a ribbon cable, or to permit more than one larger-diameter splices to be retained in a splice block, one above the other, within the depth of the splice tray, the channels may be slanted at an angle with respect to the base of the splice tray as shown in FIG. 29. Alternatively, the channels may simply be stacked one above the other. The splice block may vary in its capacity by either changing the height of the block—so as to increase the number of channels vertically; or by changing the width of the block—so as to change the number of channels, and the corresponding footprint of the block, horizontally across the base of the splice tray.

The splice block 160 securely holds the optical fiber splices 166 and prevents damage thereto such as may be caused by mechanical shock and vibration. The splice block 160 accommodates a variety of different manufacturers' splices 166 with different external dimensions. The splice block may be formed of a wide variety of materials across the range of hardness and durability. Preferably the splice block is formed of a compressed foam formed of a material and process known in the art such as a silicon rubber material which may be extruded, injected molded or die cut to the desired shape of the splice block. A compressed foam is preferable because it retains its shape and retains the splice with a high degree of friction while placing minimal mechanical stress on the fiber splice. Compressed foams or materials which may alternately be used to form the splice block include rubberized vinyl, PVC, polyurethane, polyethylene, neoprene, neoprene blends, silicone, EPDM, Nitrile, Acrylic, Latex, EPT, ECH, Rubber, SBR, Hypalon, Viton, Thiokol, Hydrin, Felt, and all polymeric materials. Alternately, the splice block may be formed of a harder plastic or a combination of plastic and compressed foam to retain and protect the splice.

In addition, the splice block may be located anywhere within the splice tray convenient to splice and retain optical fiber splices. The splice block 160 may be secured in the splice tray 10 with a two-sided fastening tape, for example. Preferably, however, the splice block 160 will be permanently mounted to an insert base 130 (as illustrated in FIGS. 19–21) during manufacture and provided to the technician as a single unit. The splice block 160 may be permanently mounted to an insert base 130 using any suitable epoxy or glue for bonding the splice block material to the insert material. As such, the splice block 160, as bonded to an insert base 130, may be installed into an insert retention socket 124 as illustrated in FIGS. 16, 26 and 27. In operation, the technician may select any pattern of optical fiber dressing inserts such as the limiter-type insert 144, spigot-type insert 148 or splice block insert 160 in organizing the splice tray 10.

Splice trays 10 may also be aligned and secured using the tier bracket hinge assembly 170 as illustrated in FIGS. 30 and 31 in cooperation with a tier bracket 171. Closures may be provided with a tier bracket which may be mounted to an end plate or base of the closure. A tier bracket is an assembly for securing and aligning splice trays within a closure. To attach a splice tray to a tier bracket, an adapter is provided which is secured to one end of the splice tray to provide the splice tray with the necessary pins to secure the splice tray to the tier bracket. Once the adapter is secured to the splice tray, the adapted splice tray is secured to the tier bracket where it may be pivoted about the pins of the adapter which is secured to the splice tray.

FIG. 30 is a top view of a splice tray 10 having an integrally formed tier bracket hinge assembly 170. The tier bracket assembly 170, as further detailed in FIG. 31, may be provided at either end or at both ends of the splice tray to permit a plurality of splice trays to be stacked one above the other in a closure which includes a tier bracket.

Each tier bracket hinge assembly 170 comprises a pair of laterally extending arms 172, each arm 172 concluding in a tab 174 formed perpendicular to the arm and no higher than the side walls 16 and 17 of the splice tray 10. Each tab 174 has formed therein a connecting pin 176. The connecting pin 176 is generally cylindrical, extending perpendicularly from the tab 174 and adapted to be received by the holes in the tier bracket.

As illustrated in FIG. 31 the arms 172 are integrally formed with the base 22 and formed from the same material as the casing 12. In addition, to provide the user with maximum convenience, the junction between the base 22 and the arm 172 may be scored during manufacture to provide a ready location to breakaway the arm 172 if not needed and if so desired by the user.

In operation, the splice tray 10 may be provided with a tier bracket hinge assembly 170 at both ends of the splice tray 10. If the user decides to use a tier bracket hinge assembly 170 during installation, the user can determine which end of the splice tray 10 should be connected to the tier bracket. Further, if a tier bracket hinge assembly 170 is provided integral to the splice tray, a tier bracket splice tray adapter is not needed. Greatly simplifying the user's installation task and reducing the cost of the installation. Once the buffer tubes and splices have been prepared and secured within the splice tray, the user may connect the tier bracket hinge assembly 170 to the tier bracket using the connecting pins 176 provided at the conclusion of the arms 172. The user may break away the unused tier bracket hinge assembly 170 at the other end of the splice tray 10.

In the alternative, where a user does not plan to use a tier bracket in an installation, the user can simply break-off the tier bracket hinge assembly 170 from each end to provide more room in the closure, without effecting the integrity of the remainder of the splice tray.

Figure 32:
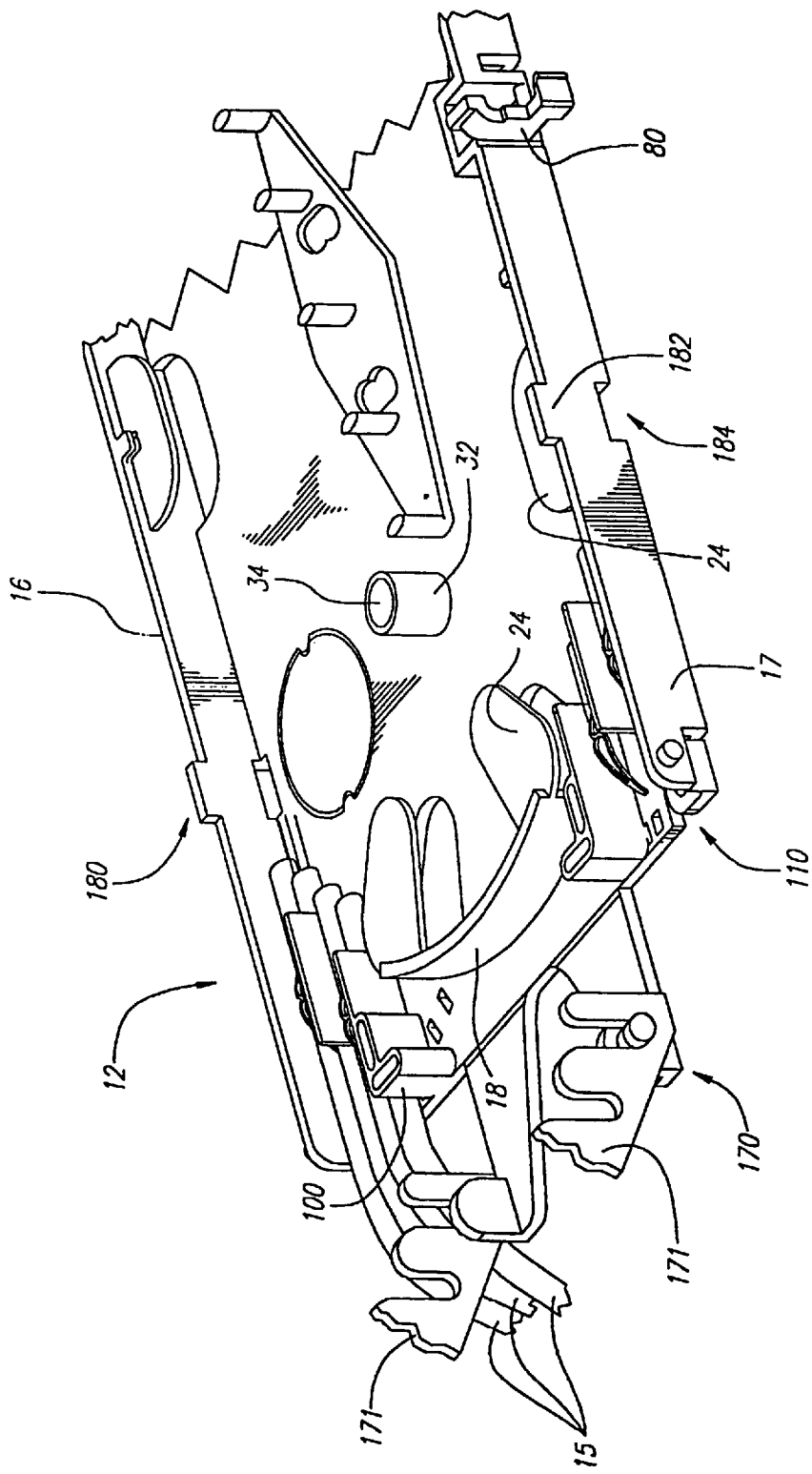
FIG. 32 is a top perspective view of a splice tray of the present invention illustrating an interlocking assembly.

As illustrated in FIGS. 30–32, the splice tray 10 further comprises an integrally formed interlocking assembly 180, generally comprising a tongue 182 and a groove 184. The interlocking assembly 180 is integrally formed with the side wall and the base 22 and formed from the same material as the casing 12. The interlocking assembly 180 may be integrally formed at one or more locations along each of the side walls 16 and 17 of the splice tray to permit a plurality of splice trays to be stacked one above the other without using any other type of hinge, alignment or pivoting assembly or interfering with such assemblies. In an alternate embodiment, the interlocking assembly may be formed at one or more locations along each end wall, or in a combination of end walls and side walls.

Each tongue 182 extends vertically above the top of the side wall to a height approximately as high as the thickness of the base 22, and is the same thickness as the side wall. The vertical height of the tongue 182 may vary from this height, but should not be substantially higher to ensure it does not interfere with proper operation of other hinging or alignment mechanisms. The tongue 182 is generally rectangular in shape and lies parallel with the top of the side wall. The groove 184 comprises a rectangular notch in the side wall, proximate the base 22 and directly beneath the tongue on the top of the side wall. The groove 184 is adapted to receive the tongue 182, but is slightly longer, horizontally, than the tongue, so as to permit the tongue 182 to easily fit into the groove 184. The groove 184 further extends to include a minimal notch in the base 22 to further permit the tongue 182 to fit within the groove 184.

In operation, a stack of splice trays 10 may be formed using the interlocking assembly 180, without the benefit of any other hinge, pivot or alignment assembly. One or more interlocking assemblies 180 may be provided on opposing side walls 16 and 17. If the splice tray includes no other means for connecting or aligning splice trays, the user can simply stack the splice trays on top of each other using the interlocking assembly 180. In this case, the tongue 182 from each splice tray below will fit into the groove 184 from the splice tray above. The splice trays are maintained in this position because each tongue 182 captures the base 22, preventing the splice tray above from moving laterally, and each tongue captures the side walls 16 and 17, preventing the splice tray above from moving longitudinally.

Preferably, the interlocking assemblies 180 are evenly spaced along the side walls 16 and 17 so as to permit a first splice tray to be installed onto a second splice tray without regard to orientation. In the alternative, if a user has arranged the interior of the splice tray to favor orientation towards one end, the interlocking assemblies may be provided to ensure the splice trays may only be oriented in one direction when stacked.

Once the buffer tubes and splices have been prepared and secured within the splice tray, the user may stack the splice trays 10 using the interlocking assembly 180 and secure the stack to the mounting platform with an industrial fastener, such as a VELCRO strap, for example.

Accordingly, it will be appreciated that although the fiber optic splice tray may be manufactured with conventional manufacturing techniques, a stack of splice trays of the present invention may be stacked a variety of ways. Further, the interior of the splice tray may be provided in a variety of configurations to meet a plurality of fiber dressing needs. More specifically, the splice trays may be aligned and secured using the lateral pivot assemblies, the longitudinal hinge assemblies, the longitudinal alignment bosses, the lateral alignment bosses, the tie bracket hinge assembly or the interlocking assembly. In addition, any selected alignment and security assembly is provided so as to not interfere with the use of any other splice tray alignment or security assembly.

Further, although a specific configuration and number of splice tray alignment and security assemblies has been provided for each embodiment, each of alignment and security assembly may be modified. For example, although two longitudinal hinge assemblies have been discussed and shown, a side wall of a splice tray may be provided with one or more longitudinal hinge assemblies in order to align and secure a stack of splice trays. Moreover, in order to provide adequate alignment and security, the longitudinal hinge assembly may be vertically wider or narrower along the side wall.

With respect to receiving buffer tubes, each buffer tube receiving channel may be modified to be wider or narrower to accommodate changes in the diameter of buffer tubes. This change could be accomplished simply by making a corresponding change to the distance between channels walls. To accommodate a greater number of buffer tubes, the number of buffer tube receiving channels may be increased by shortening the length of the end wall, for example and adding one or more channel walls and buffer tube retainers. Similarly, to accommodate fewer buffer tubes, the number of buffer tube receiving channels may be decreased by lengthening the end wall, for example, and removing one or more channel walls and buffer tube retainers. Each of these changes would be made during the manufacturing process to provide a different embodiment, as required by the user, for installation.

Regarding dressing optical fiber splices within the splice tray, the splice tray may be provided with a wide variety of configuration options. The splice tray may or may not be provided with insert sockets to facilitate fiber dressing. If sockets are not provided, dressing inserts may be secured to the interior of the splice tray using double-sided tape or an appropriate glue or epoxy. On the other hand, the interior of the splice tray may include one or more insert retention sockets. These sockets may be provided in virtually any location to help the user properly dress each optical fiber introduced into the splice tray.

Each insert socket may be used to retain a wide variety of inserts. As an example only, the limiter-type, spigot-type, blank, and splice block-type inserts have been illustrated in some detail. Clearly, the inserts may be provided in other configurations including a greater or smaller number of tabs or posts with which to dress each fiber. With respect to retention of the insert within the insert retention socket, any type of mechanical interface which securely retains the insert is acceptable. This includes a screw in-place interface or a snap in-place interface which may be permanent or in which the insert may be removable. The insert may also be molded in-place during manufacture or affixed into the base of the splice tray, without the benefit of an insert retention socket, using an acceptable glue or epoxy typically used to secure plastic parts.

Further, the splice tray may include any combination of features described. For example, the splice tray may be provided with side walls, end walls and a base with any combination of: lateral pivot assemblies; longitudinal hinge assemblies; alignment bosses; buffer tube receiving channels having a buffer tube retainer; insert retention socket and insert; splice block; tier bracket hinge assembly and interlocking assembly.

Additional variations and modifications of the preferred embodiment described above may also be made as will be appreciated by those skilled in the art and accordingly the above description of the present invention is only illustrative in nature. The invention is further defined by the following claims.

What is claimed is:

1. A fiber optic splice tray for storing spliced ends of optical fibers from a first and a second buffer tube, each of which includes a plurality of optical fibers, the splice tray comprising:

a generally elongate casing having two generally parallel side walls, first and second end walls and a generally planar base, said side walls and said end walls extending substantially perpendicularly to said base and having free edges defining generally a plane formed with optical fiber retaining means projecting inwardly therefrom and spaced from said base for receiving and retaining lengths of optical fibers positioned along said side walls and said end walls; and at least one of the following, none of which mechanically interferes with the other when a plurality of splice trays is installed and stacked in a closure, although each is present on the splice tray:

a lateral pivot assembly integrally formed at a first end of the casing proximate a first end of each side wall to permit a first splice tray to pivot about an axis formed at a first end of a second splice tray, wherein said lateral pivot assembly has an open position and a closed position;

a longitudinal hinge assembly integrally formed with a first side wall of the casing to permit a first splice tray to pivot about an axis formed at the first side wall of a second splice tray, wherein the longitudinal hinge assembly has an open position and a closed position;

an alignment boss integrally formed in the base and extending generally perpendicularly from the base, the alignment boss having an alignment sleeve adapted to receive an alignment guide;

a buffer tube receiving channel comprising a portion of the base, a buffer tube retainer secured to the base, and a channel wall integrally formed with the base proximate an end wall and rising perpendicular from the base parallel with the side walls to substantially the same height as the retaining means, wherein a buffer tube may be resiliently retained in the buffer tube receiving channel;

an insert assembly having an insert for dressing an optical fiber splice and having an insert retention socket integrally formed as an aperture in the base adapted to receive the insert assembly;

an insert assembly having an insert for retaining an optical fiber splice and having an insert retention socket integrally formed as an aperture in the base adapted to receive the insert assembly; and an interlocking assembly having a tongue integrally formed as a coplanar extension of the sidewall and a groove integrally formed in the side wall directly beneath the tongue and adapted to receive a tongue from a corresponding splice tray.

2. A fiber optic splice tray adapted for connecting to a second splice tray in a compact manner, comprising:

a casing having two generally parallel side walls, first and second end walls and a generally planar base, said side walls and said end walls extending substantially perpendicular to said base; and means for laterally connecting to a second splice tray to permit the first splice tray to pivot about a lateral axis formed generally parallel to a first end of the second splice tray, said means for laterally connecting integrally formed with said casing at a first end of said casing, wherein said means for laterally connecting is constructed to be movable between an open position adapted to engage the second splice tray and a closed position wherein the means for laterally connecting lies co-planar with the base.

3. A splice tray as recited in claim 2, wherein the means for laterally connecting comprises:

a connecting pin integrally formed with and extending perpendicularly from the side wall; and a pin retainer provided with a through-hole, said pin retainer integrally formed with the side wall and pivotally formed with the side wall to permit the pin retainer to attain an open or a closed position.

4. A splice tray as recited in claim 3, wherein in the closed position the pin retainer lies co-planar with the base and in the open position the pin retainer is parallel with the side wall and adapted to receive a connecting pin, wherein the first splice tray may be connected to the second splice tray by retaining a connecting pin of the second splice tray within a pin retainer in the open position of the first splice tray.

5. A fiber optic splice tray as set out in claim 2, further comprising:

means for aligning a first splice tray and a second splice tray, said means for aligning integrally formed in said base and adapted to receive an alignment guide.

6. A splice tray as recited in claim 5, the alignment guide having two ends which may be secured together, and the means for aligning comprising:

an alignment boss extending generally perpendicularly from the base, the alignment boss having an alignment sleeve adapted to receive the alignment guide, wherein a plurality of splice trays may be secured and aligned by routing the alignment guide successively through corresponding alignment bosses to form a stack of splice trays which are secured via the alignment guide.

7. A fiber optic splice tray as set out in claim 2, further comprising:

means for removably interlocking a first splice tray and a second splice tray, said means for interlocking integrally formed in said splice tray.

8. A splice tray as recited in claim 7, the means for interlocking comprising:

a tongue integrally formed as a coplanar extension of the sidewall; and a groove integrally formed in the side wall directly beneath the tongue adapted to receive a tongue from a corresponding splice tray, wherein a plurality of splice trays may be secured against longitudinal and lateral movement by adapting a first tray to a second tray whereby the tongue from the second splice tray is secured within the groove of the first splice tray.

9. A splice tray as recited in claim 2, further comprising second means for laterally connecting a plurality of splice trays integrally formed at a second end of said casing proximate a second end of each side wall to permit the first splice tray to pivot about an axis formed at a second end of the second splice tray, wherein the first splice tray may be pivotally connected by said means for laterally connecting and said second means for laterally connecting to either end of the second splice tray.

10. A first fiber optic splice tray adapted for connecting to a second splice tray, comprising:

a generally elongate casing having two generally parallel side walls, first and second end walls and a generally planar base, said side walls and said end walls extending substantially perpendicular to said base and having free edges defining generally a plane formed with fiber retaining means projecting inwardly therefrom and spaced from said base for receiving and retaining lengths of optical fibers positioned along said side walls and said end walls; and means for longitudinally connecting to a second splice tray, to permit the first splice tray to pivot about a longitudinal axis formed generally parallel to a first side wall of the second splice tray, said means for longitudinally connecting formed with a first side wall of said casing, wherein said means for longitudinally connecting is constructed so as to be movable between an open position and a closed position.

11. A splice tray as recited in claim 10, wherein the means for longitudinally connecting comprises:

a pivot bar integrally formed with the side wall;

hinge assembly means integrally and pivotally formed with the side wall for capturing and retaining the pivot bar, wherein said hinge assembly means has an open or a closed position; and retention means integrally formed in the side wall for retaining the hinge assembly means.

12. A splice tray as recited in claim 11, wherein the hinge assembly means comprises:

a hinge assembly comprising:
  a locking tab;
  a pivot bar guide;
  a hinge assembly tab; and
  a hinge assembly retainer, wherein the retaining means comprises:
  a retention cavity adapted to receive the hinge assembly retainer; and
  a locking tab keeper adapted to receive the locking tab, wherein in the closed position the hinge assembly means of a first splice tray is inserted into the retention means of a first splice tray and the hinge assembly means of a second splice tray is inserted into the retention means of a second splice tray, whereby the pivot bar of the first splice tray is captured by the pivot bar guide of the second splice tray to pivotally retain the second splice tray.

13. A splice tray as recited in claim 12, further comprising:

a cover; and cover retention tabs integrally formed in the side walls to retain the cover between the retention tabs and the fiber retaining means secured to the side wall, wherein the cover includes notches adapted to receive the retention cavity to prevent the cover from laterally shifting.

14. A splice tray as recited in claim 10, further comprising second means for longitudinally connecting a plurality of splice trays integrally formed at a second side wall of said casing to permit the first splice tray to pivot about an axis formed at the second side wall of the second splice tray, wherein the first splice tray may be pivotally connected by one of said means for longitudinally connecting and said second means for longitudinally connecting to a side wall of the second splice tray.

15. A splice tray as recited in claim 14, further comprising at least two means for longitudinally connecting.

16. A splice tray as recited in claim 10, further comprising at least two means for longitudinally connecting.

17. A fiber optic splice tray alignment system comprising:

a fiber optic splice tray comprising:

a generally elongate casing having two generally parallel side walls, first and second end walls and a generally planar base, said side walls and said end walls extending substantially perpendicular to said base;

a hinge structure, constructed so as to fold between an open and closed position and wherein the hinge structure is adapted to secure to a second splice tray in a pivotal manner when in the open position, means for aligning a first splice tray and a second splice tray, said means for aligning separate from said hinge structure and integrally formed in said base and adapted to receive an alignment guide;

a mounting platform; and an alignment guide secured to the mounting platform.

18. A splice tray alignment system as recited in claim 17, the means for aligning comprising:

an alignment boss integrally formed with the base, the boss extending generally perpendicularly from the base and having an alignment sleeve adapted to receive the alignment guide, wherein a plurality of splice trays may be secured and aligned by routing the alignment guide successively through corresponding alignment bosses to form a stack of aligned and secured splice trays.

19. A splice tray as recited in claim 17, wherein the means for aligning comprises longitudinal alignment means comprising at least two means for aligning located proximate a junction of a first side wall and each end wall and aligned with each other parallel to the end wall.

20. A splice tray as recited in claim 17, wherein the means for aligning comprises lateral alignment means comprising at least two means for aligning located proximate a junction of a first end wall and each side wall and aligned with each other parallel to the side wall.

21. A fiber optic splice tray for storing spliced ends of optical fibers from a first and a second buffer tube or ribbon cable, each buffer tube or ribbon cable including at least one optical fiber, the splice tray comprising:

a generally elongate casing having two generally parallel side walls, first and second end walls and a generally planar base, said side walls and said end walls extending substantially perpendicular to said base; and means proximate an end wall for securing a buffer tube or ribbon cable to the splice tray, said means for securing defining a passageway for the buffer tube or ribbon cable having a varying cross-sectional area accommodating the different cross-sectional size of a buffer tube or ribbon cable.

22. A splice tray as recited in claim 21, the means for securing a buffer tube comprising a buffer tube receiving channel comprising:

a portion of the base proximate an end of the splice tray;

a channel wall integrally formed with the base proximate said portion of the base and rising perpendicularly from the base parallel with the side walls; and a buffer tube retainer secured to the base proximate the channel wall, wherein a buffer tube may be resiliently retained in the buffer tube receiving channel formed by the base, the channel wall and the buffer tube retainer.

23. A splice tray as recited in claim 22, wherein the buffer tube retainer is integrally formed with the base and located between two channel walls wherein each side of the buffer tube retainer serves a different buffer tube receiving channel and wherein the buffer tube retainer comprises arcuate ribs which form a compressive rib structure to firmly yield to lateral pressure to safely secure a buffer tube.

24. A splice tray as recited in claim 22, wherein at least two buffer tubes may be retained in the buffer tube receiving channel.

25. A splice tray as recited in claim 22, wherein a ribbon cable may be retained in the buffer tube receiving channel.

26. A splice tray as recited in claim 22, the means for securing a buffer tube further comprising a pair of apertures in the base adapted to receive a means for tying down a buffer tube wherein a buffer tube may be secured to the base of the splice tray by said means for tying.

27. An assembly of fiber optic splice trays comprising:

first and second splice trays each having a generally elongate casing having two generally parallel side walls, first and second end walls and a generally planar base, said side walls and said end walls extending substantially perpendicular to said base;

an alignment guide integrally formed with the casing of the first splice tray; and means for aligning the first splice tray and a second splice tray, said means for aligning integrally formed in the casing of said second splice tray and adapted to receive the alignment guide.

28. An assembly of splice trays as recited in claim 27, the alignment guide having two ends which may be secured together, and the means for aligning comprising:

an alignment boss extending generally perpendicularly from the base, the alignment boss having an alignment sleeve adapted to receive the alignment guide, wherein a plurality of splice trays may be secured and aligned by routing the alignment guide successively through corresponding alignment bosses to form an assembly of splice trays which are secured via the alignment guide.

* * * * *